United States Patent
Ruan et al.

(10) Patent No.: US 11,835,733 B2
(45) Date of Patent: Dec. 5, 2023

(54) CONTROL LIGHT INTENSITY THROUGH SCATTERING MEDIA WITH SPECKLE INTENSITY SEQUENCING

(71) Applicant: California Institute of Technology, Pasadena, CA (US)

(72) Inventors: Haowen Ruan, Pasadena, CA (US); Changhuei Yang, South Pasadena, CA (US); Jian Xu, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 403 days.

(21) Appl. No.: 17/023,070

(22) Filed: Sep. 16, 2020

(65) Prior Publication Data

US 2021/0080742 A1    Mar. 18, 2021

Related U.S. Application Data

(60) Provisional application No. 62/900,813, filed on Sep. 16, 2019.

(51) Int. Cl.
*H04B 10/00* (2013.01)
*G02B 27/48* (2006.01)
(Continued)

(52) U.S. Cl.
CPC ......... *G02B 27/48* (2013.01); *G02B 26/0833* (2013.01); *G02B 26/105* (2013.01); *H04B 10/504* (2013.01); *H04B 10/61* (2013.01)

(58) Field of Classification Search
CPC ... H04B 10/11; H04B 10/112; H04B 10/1123; H04B 10/114; H04B 10/1143;
(Continued)

(56) References Cited

U.S. PATENT DOCUMENTS 11,204,319 B2 * 12/2021 Dholakia ........... G01N 21/6458
11,313,667 B2 *  4/2022 Müller .............. G01B 9/02057
(Continued)

OTHER PUBLICATIONS

Vellekoop, I.M., et al., "Focusing coherent light through opaque strongly scattering media", Optics Letters, Aug. 2007, pp. 2309-2311, vol. 32, No. 16.
(Continued)

*Primary Examiner* — Hanh Phan
(74) *Attorney, Agent, or Firm* — GATES & COOPER LLP

(57) ABSTRACT

Optical wavefront shaping has been the standard technique to control light through scattering media. Implicit in this dominance is the assumption that knowledge of the optical phase is a necessity for optical control through scattering media. In this paper, we challenge this assumption by reporting on an intensity-only approach for light control through (or reflected from) a disordered scattering medium—optical-channel-based intensity streaming (OCIS). Instead of actively tuning the interference between the optical paths via wavefront shaping, OCIS can control light and transmit information through or from scattering media with linear intensity operation, which not only simplifies and speeds up the system but also enables new applications. We experimentally created focus patterns through scattering media in a sub-millisecond timescale with a phase-manipulation-free setup. We also demonstrate that, unlike wavefront shaping, OCIS can readily generate distinct energy null points through scattering media. Finally, we demonstrate that OCIS enables a scattering medium mediated secure optical communication application.

20 Claims, 21 Drawing Sheets

(51) Int. Cl.
*G02B 26/08* (2006.01)
*H04B 10/61* (2013.01)
*H04B 10/50* (2013.01)
*G02B 26/10* (2006.01)

(58) Field of Classification Search
CPC .............. H04B 10/1149; H04B 10/40; H04B 10/2507; H04B 10/504; H04B 10/61; H04B 10/6161; H04B 10/6165; G02B 26/0833; G02B 26/105; G02B 27/48
USPC ....... 398/118, 119, 128, 129, 130, 131, 135, 398/136, 158, 159, 162, 183, 188, 202, 398/208, 209; 356/73.1, 450, 445
See application file for complete search history.

(56) References Cited

U.S. PATENT DOCUMENTS

2012/0182558 A1\* 7/2012 Masumura ........... A61B 5/0073
356/450
2019/0173587 A1\* 6/2019 Hendrickson .......... G02B 27/48

OTHER PUBLICATIONS

Mosk, A.P., et al., "Controlling waves in space and time for imaging and focusing in complex media", Nature Photonics, May 2012, pp. 283-292, vol. 6.
Horstmeyer, R., et al., "Guidestar-assisted wavefront-shaping methods for focusing light into biological tissue", Nature Photonics, Sep. 2015, pp. 563-571, vol. 9.
Rotter, S., et al., "Light fields in complex media: Mesoscopic scattering meets wave control", Reviews of Modern Physics, Jan.-Mar. 2017, pp. 015005-1-015005-57, vol. 89, No. 1.
Kim, M., et al., "Transmission matrix of a scattering medium and its applications in biophotonics", Optics Express, May 2015, pp. 12648-12668, vol. 23, No. 10.
Yu, H., et al., "Recent advances in wavefront shaping techniques for biomedical applications", Curr. Appl. Phys., 2015, pp. 632-641, vol. 15.
Popoff, S.M., et al., "Measuring the Transmission Matrix in Optics: An Approach to the Study and Control of Light Propagation in Disordered Media", Physical Review Letters, Mar. 2010, pp. 100601-1-100601-4, vol. 104.
Yu, H., et al., "Measuring Large Optical Transmission Matrices of Disordered Media", Physical Review Letters, Oct. 2013, pp. 153902-1-153902-5, vol. 111.
Jang, M., et al., "Wavefront shaping with disorder-engineered metasurfaces", Nature Photonics, Feb. 2018, pp. 84-90, vol. 12.
Daniel, A., et al., "Wavefront shaping for glare reduction", Optica, Oct. 2016, pp. 1104-1106, vol. 3, No. 10.
Xu, J., et al., "Focusing light through scattering media by transmission matrix inversion", Optics Express, Oct. 2017, pp. 27234-27246, vol. 25, No. 22.
Vellekoop, I.M., et al., "Demixing light paths inside disordered metamaterials", Optics Express, Jan. 2008, pp. 67-80, vol. 16, No. 1.
Vellekoop, I.M., "Feedback-based wavefront shaping", Optics Express, May 2015, pp. 12189-12206, vol. 23, No. 9.
Bromberg, Y., et al., "Ghost imaging with a single detector", Physical Review A, 2009, pp. 053840-1-053840-4, vol. 79.
Hsieh, C-L., et al., "Digital phase conjugation of second harmonic radiation emitted by nanoparticles in turbid media", Optics Express, Jun. 2010, pp. 12283-12290, vol. 18, No. 12.
Cui, M., et al., "Implementation of a digital optical phase conjugation system and its application to study the robustness of turbidity suppression by phase conjugation", Optics Express, Feb. 2010, pp. 3444-3455, vol. 18, No. 4.
Wang, D., et al., "Focusing through dynamic tissue with millisecond digital optical phase conjugation", Optica, Aug. 2015, pp. 728-735, vol. 2, No. 8.
Bromberg, Y., et al., "Remote key establishment by random mode mixing in multimode fibers and optical reciprocity", Optical Engineering, Jan. 2019, pp. 016105-1-016105-10, vol. 58, No. 1.
Horstmeyer, R., et al., "Physical key-protected one-time pad", Scientific Reports, Dec. 2013, pp. 1-6, vol. 3, No. 3543.
Clemente, P., et al., "Optical encryption based on computational ghost imaging", Optics Letters, Jul. 2010, pp. 2391-2393, vol. 35, No. 14.
Bennett, C.H., "Experimental Quantum Cryptography", J. Cryptology, 1992, pp. 3-28, vol. 5.
Popoff, S., et al., "Image transmission through an opaque material", Sep. 2010, pp. 1-5, vol. 1, No. 81.
Conkey, D.B., et al., "High-speed scattering medium characterization with application to focusing light through turbid media", Optics Express, Jan. 2012, pp. 1733-1740, vol. 20, No. 2.
Durduran, T., et al., "Diffuse Optics for Tissue Monitoring and Tomography", Rep Prog Phys, Jul. 2010, pp. 1-87, vol. 73, No. 7.
Student, "Probable error of a correlation coefficient", Biometrika 1908, pp. 302-310, vol. 6.
Kalai, Y.T., et al., "A Survey of Leakage-Resilient Cryptography", Providing Sound Foundations for Cryptography: On the work of Shafi Goldwasser and Silvio Micali, 2019, pp. 1-55.
Katz, O., et al., "Looking around corners and through thin turbid layers in real time with scattered incoherent light", Nature Photonics, Aug. 2012, pp. 549-553, vol. 6.
Katz, O., et al., "Non-invasive single-shot imaging through scattering layers and around corners via speckle correlations", Nature Photonics, Oct. 2014, pp. 784-790, vol. 8.
Wang, Y.M., et al., "Deep-tissue focal fl uorescence imaging with digitally time-reversed ultrasound-encoded light", Nature Communications, 2012, pp. 1-8, vol. 3, No. 928.
Ruan, H., et al., "Iterative Time-Reversed Ultrasonically Encoded Light Focusing in Backscattering Mode", Nature Communications, 2014, pp. 1-7, vol. 4, No. 7156.
Freund, I., et al., "Memory Effects in Propagation of Optical Waves through Disordered Media", Physical Review Letters, Nov. 1988, pp. 2328-2332, vol. 61, No. 20.
Judkewitz, B., et al., "Translation correlations in anisotropically scattering media", Nature Physics, Aug. 2015, pp. 684-689, vol. 11.

\* cited by examiner

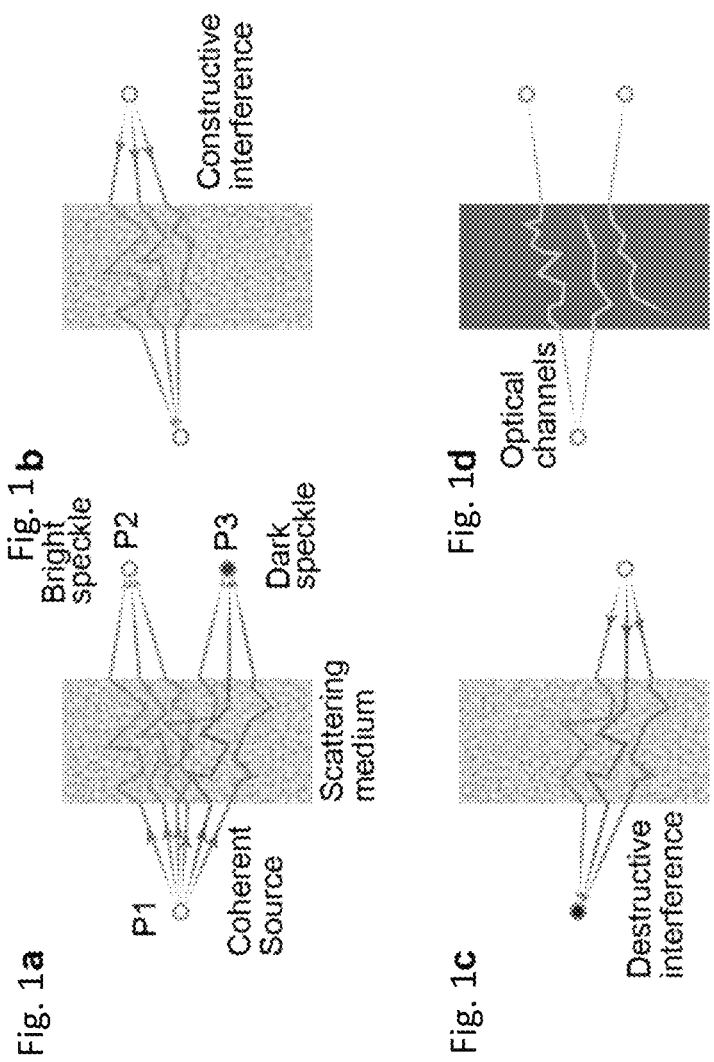

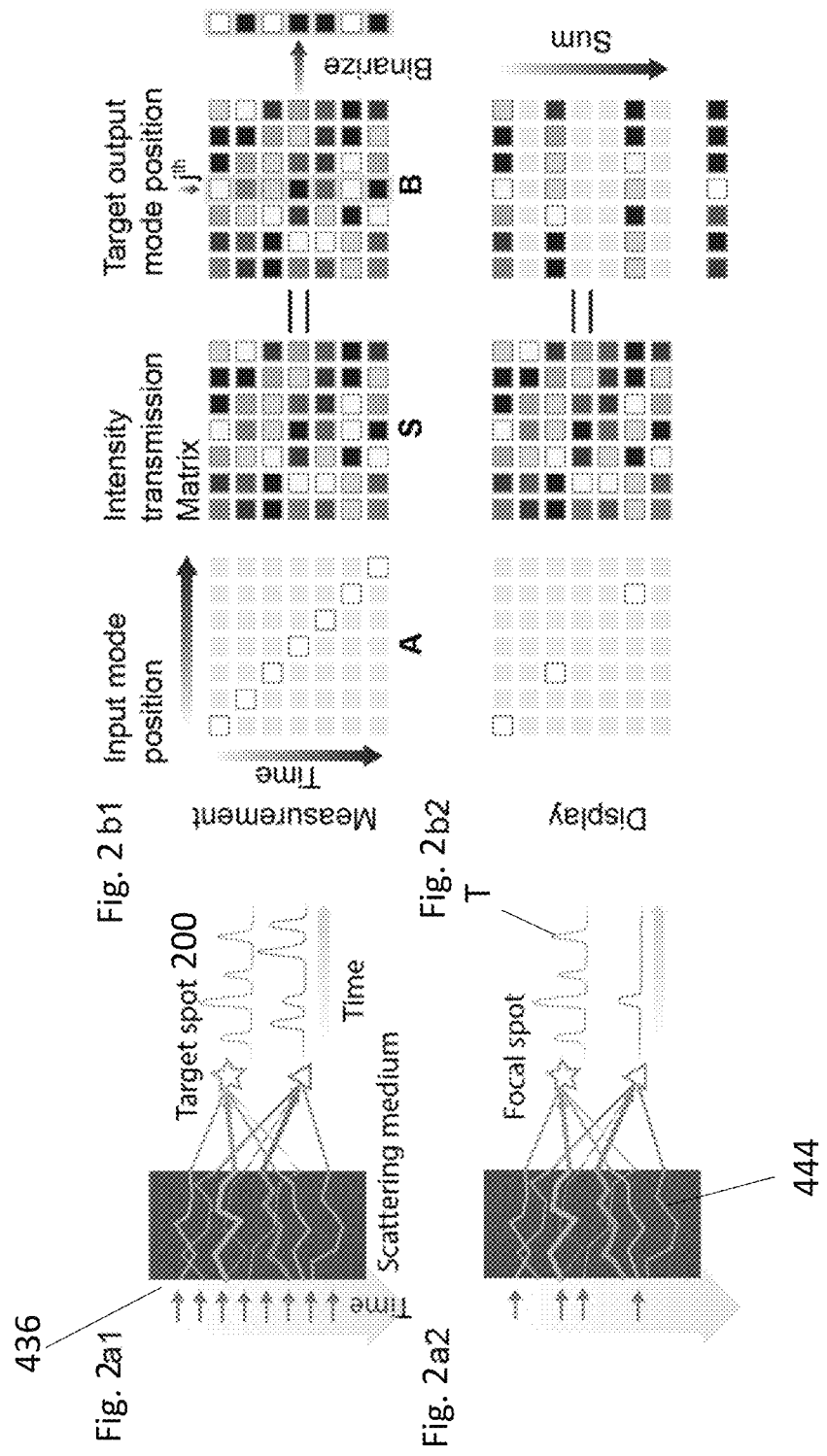

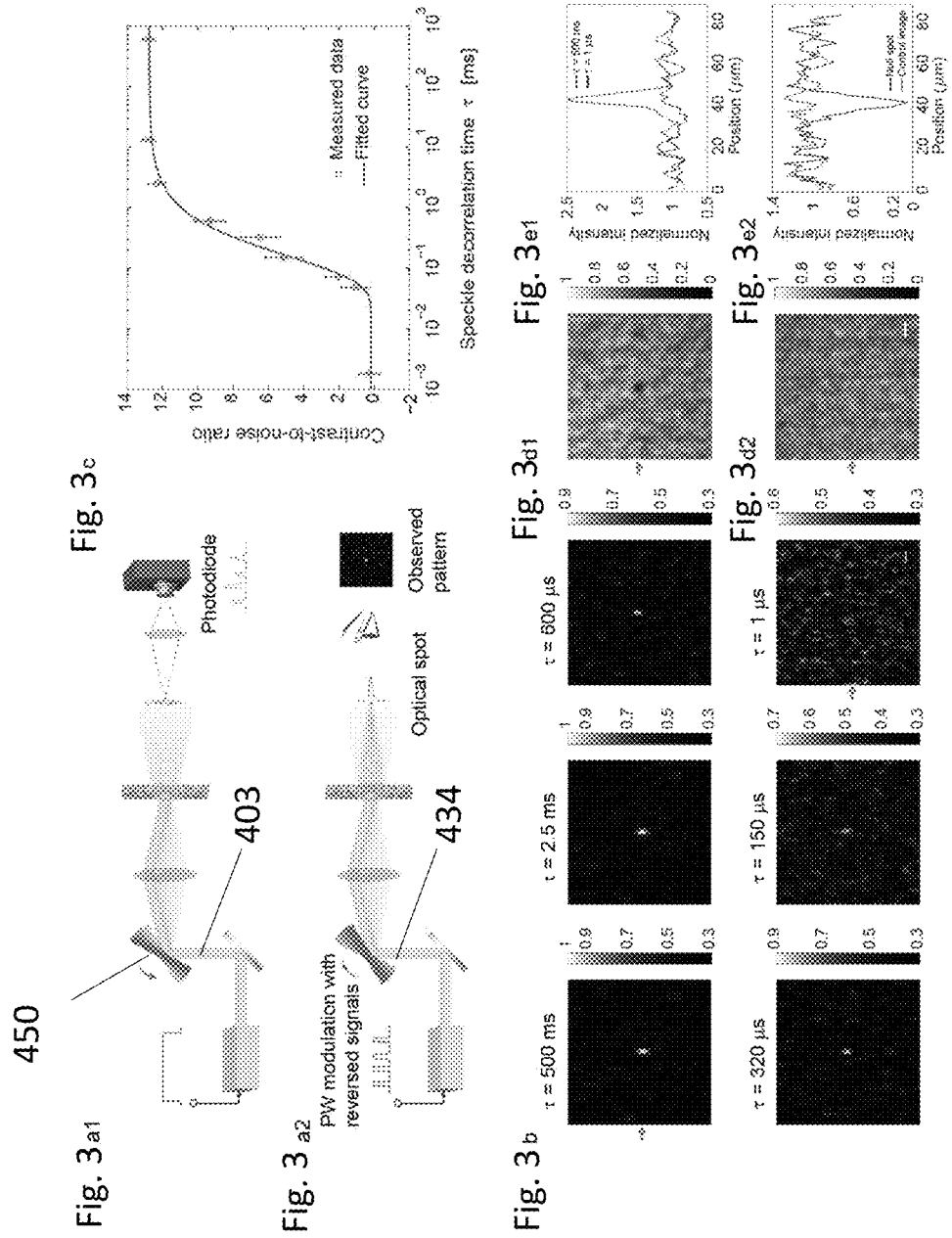

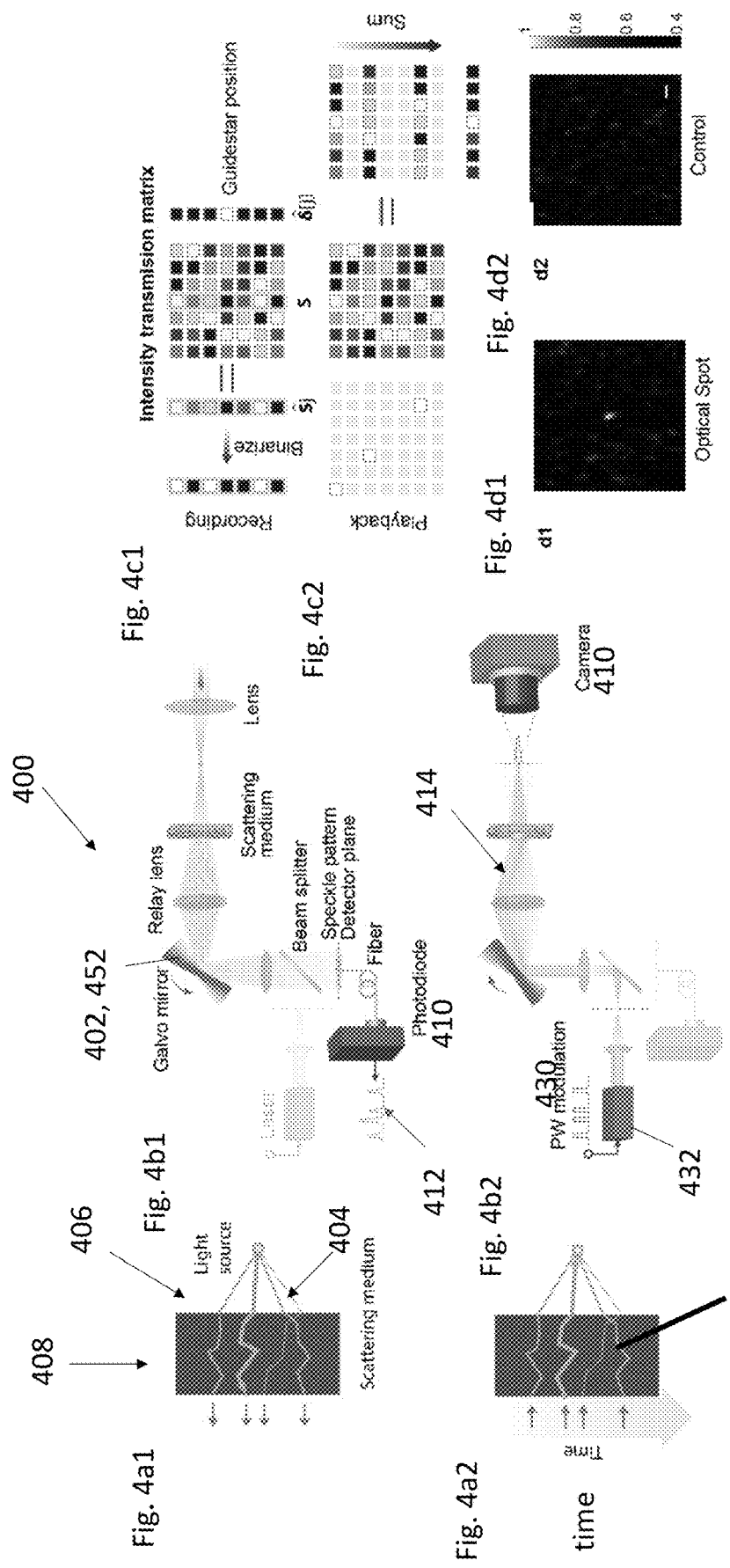

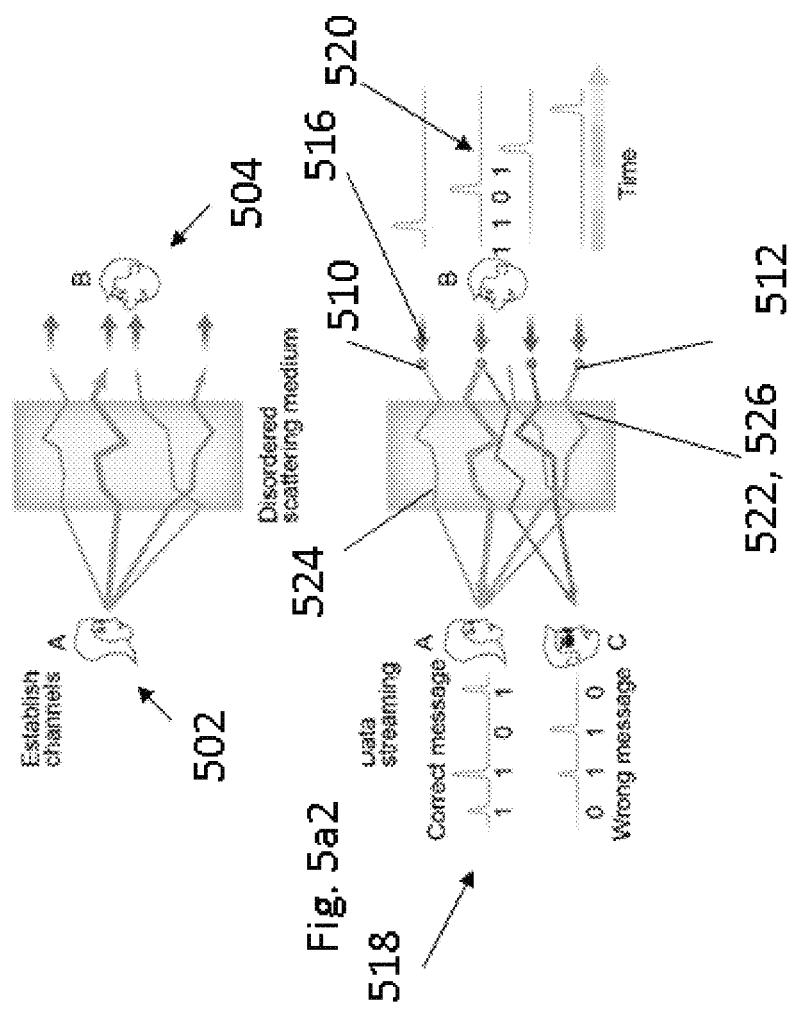

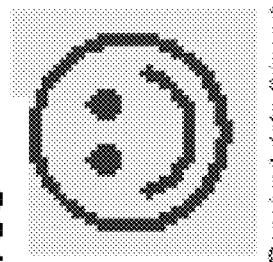
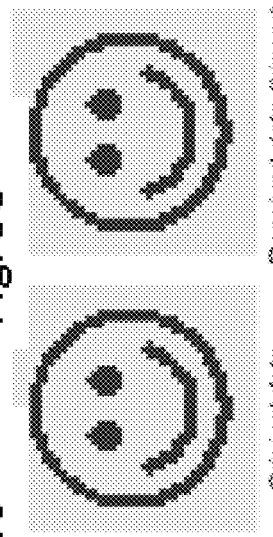
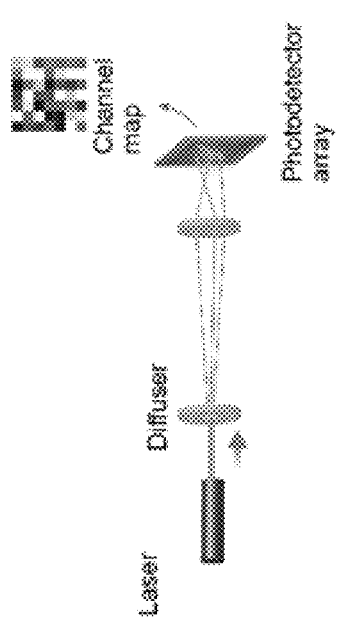
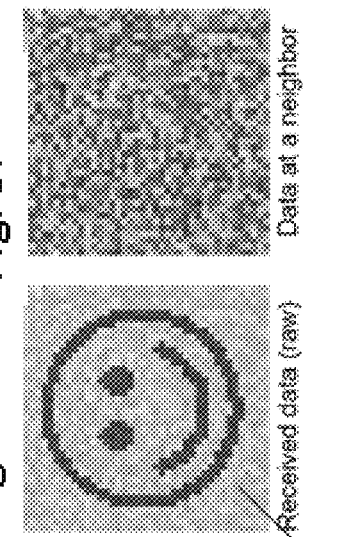
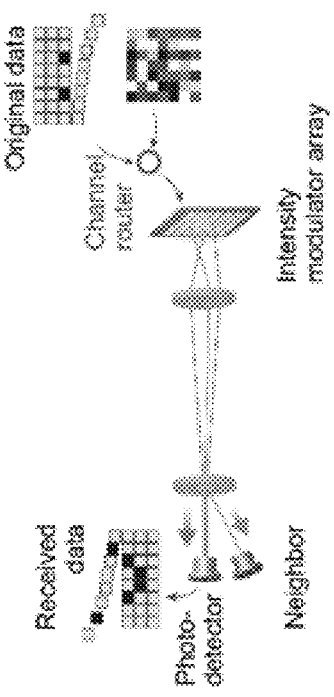

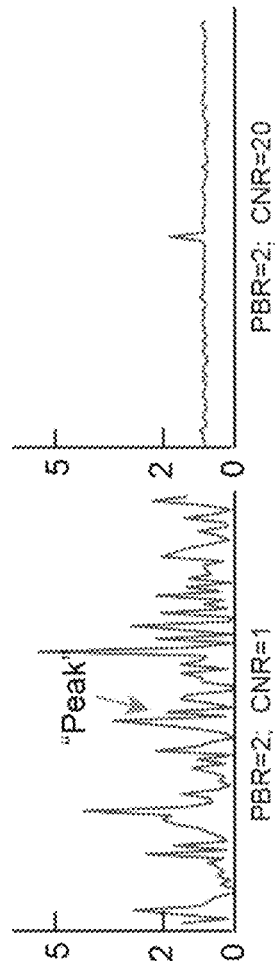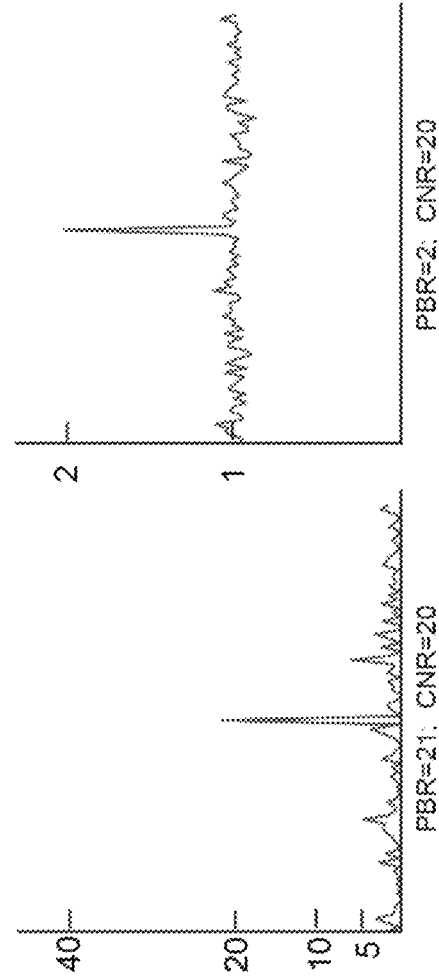

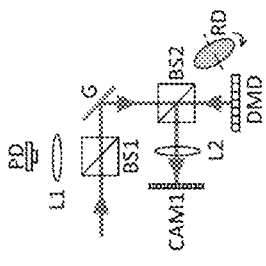
Fig. 7c1
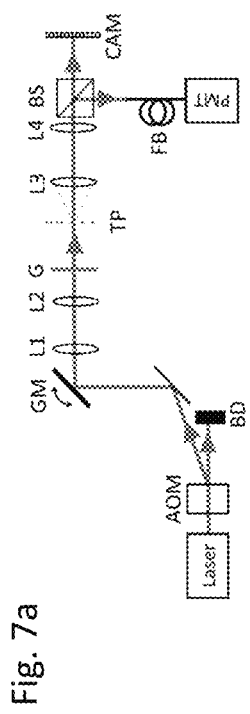
Fig. 7a
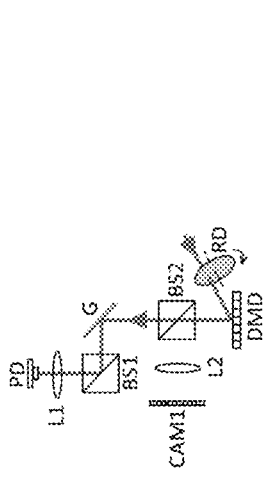
Fig. 7c2
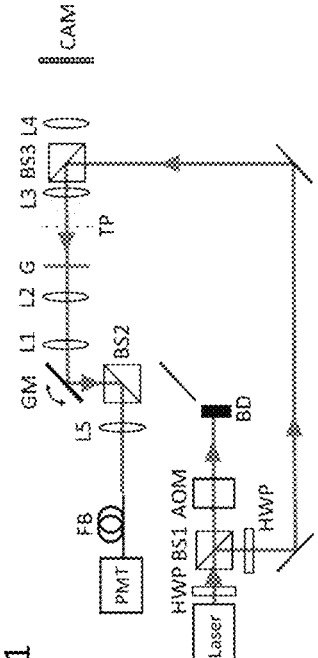
Fig. 7b1
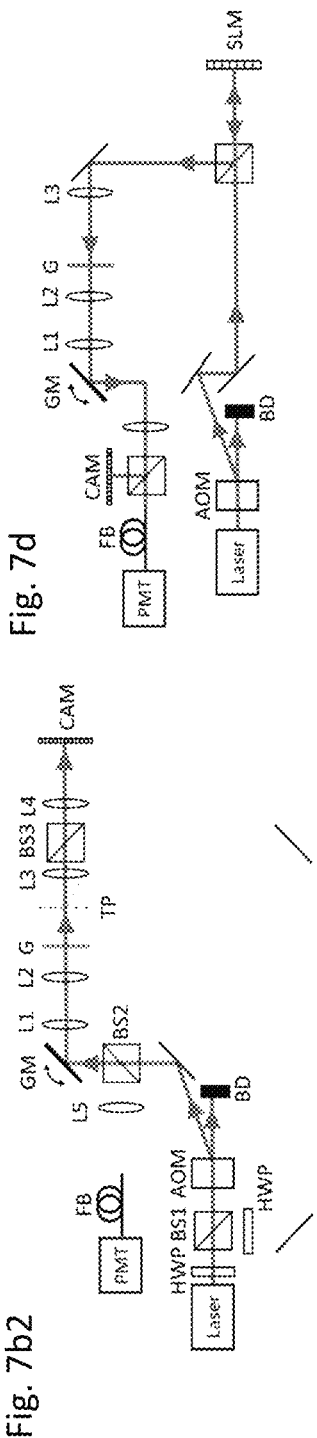
Fig. 7d
Fig. 7b2

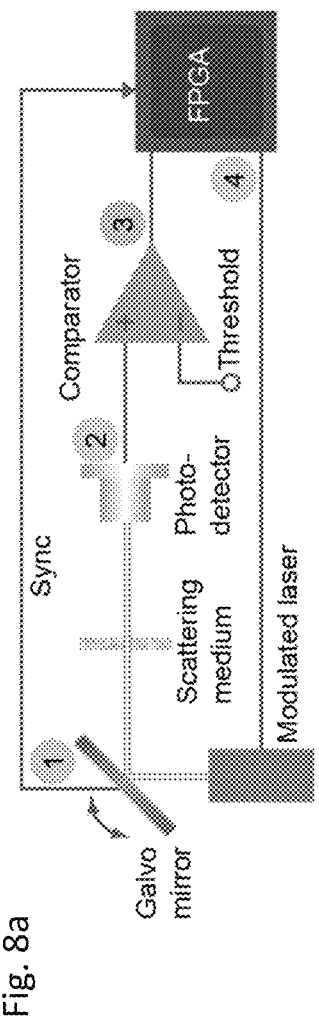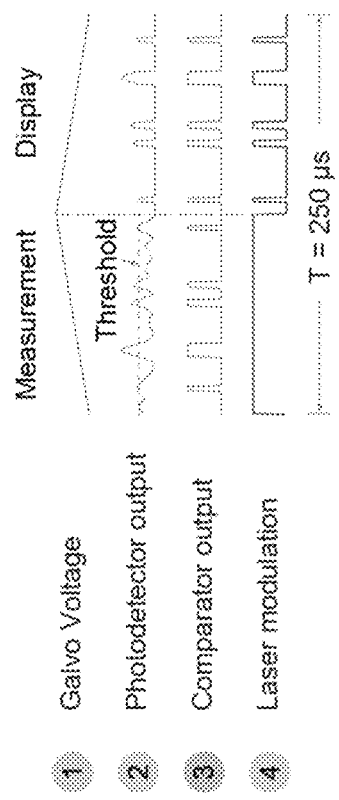
Fig. 8a
Fig. 8b

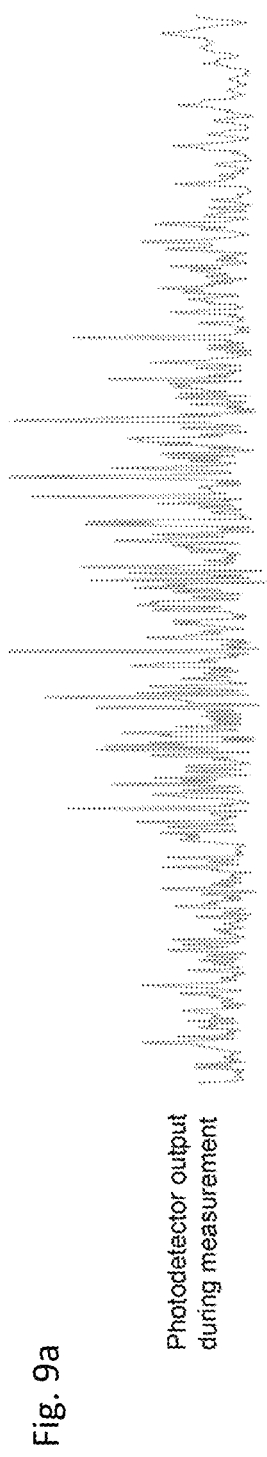
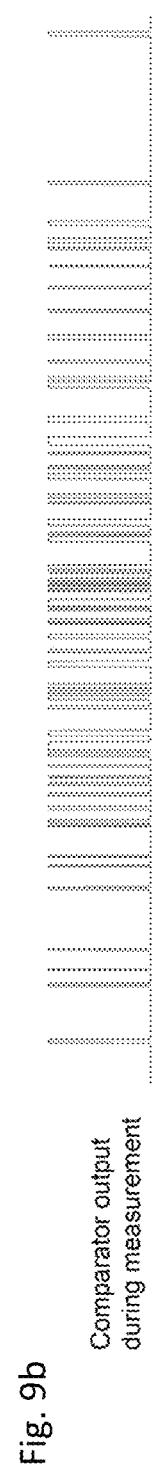
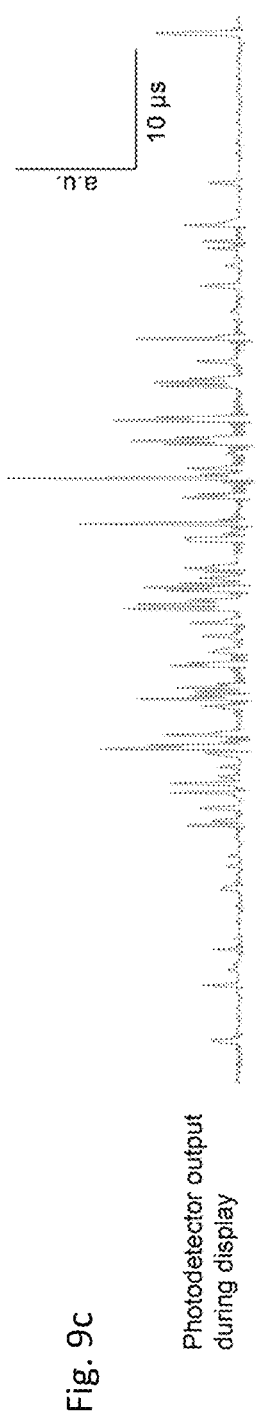
Fig. 9a Photodetector output during measurement
Fig. 9b Comparator output during measurement
Fig. 9c Photodetector output during display

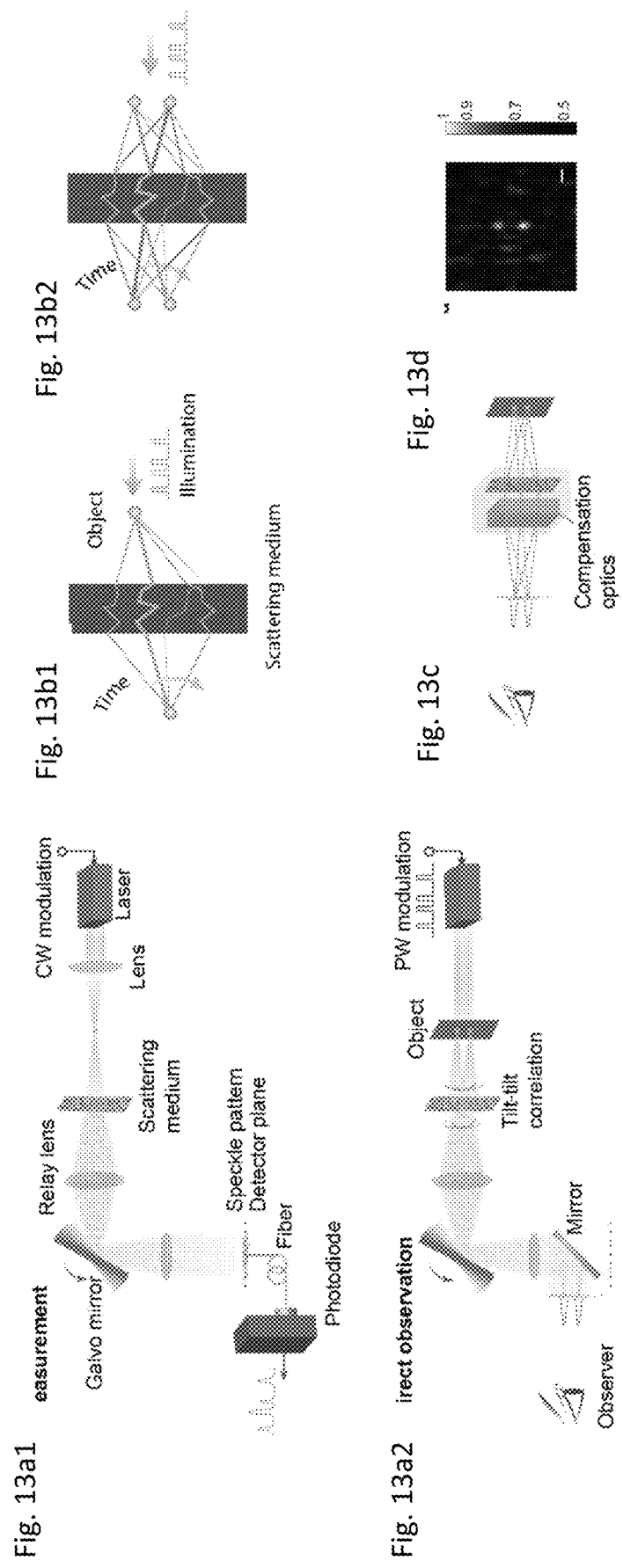

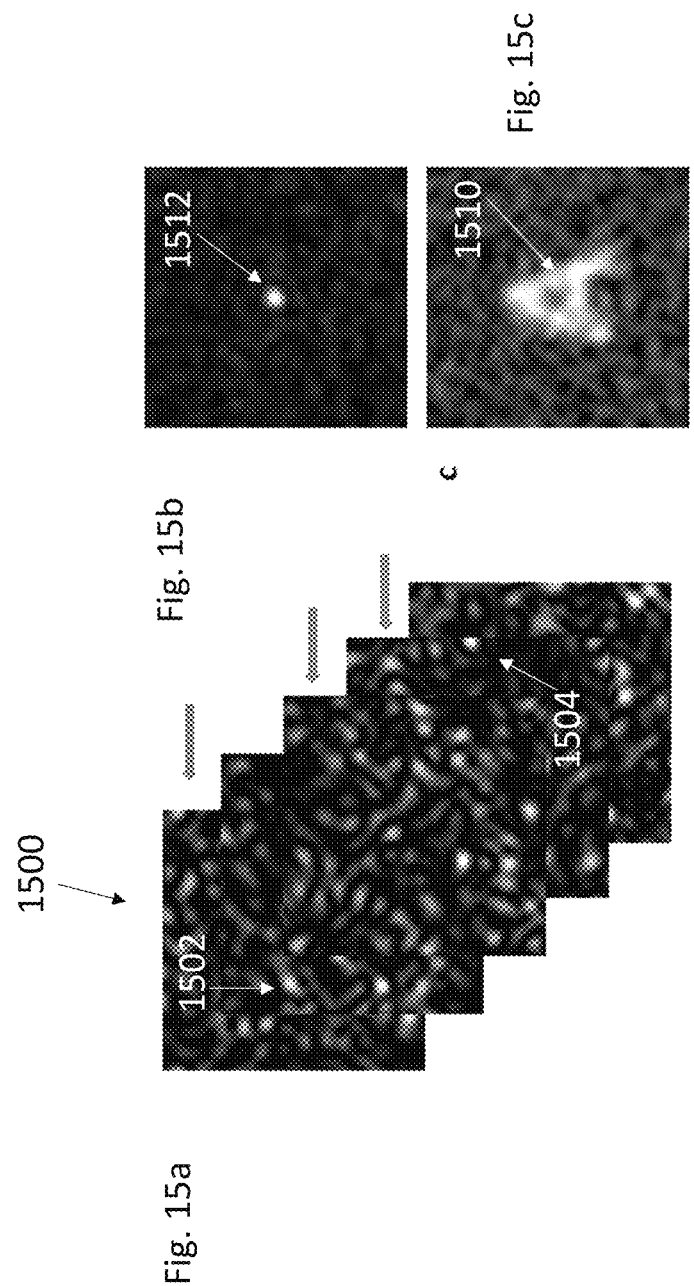

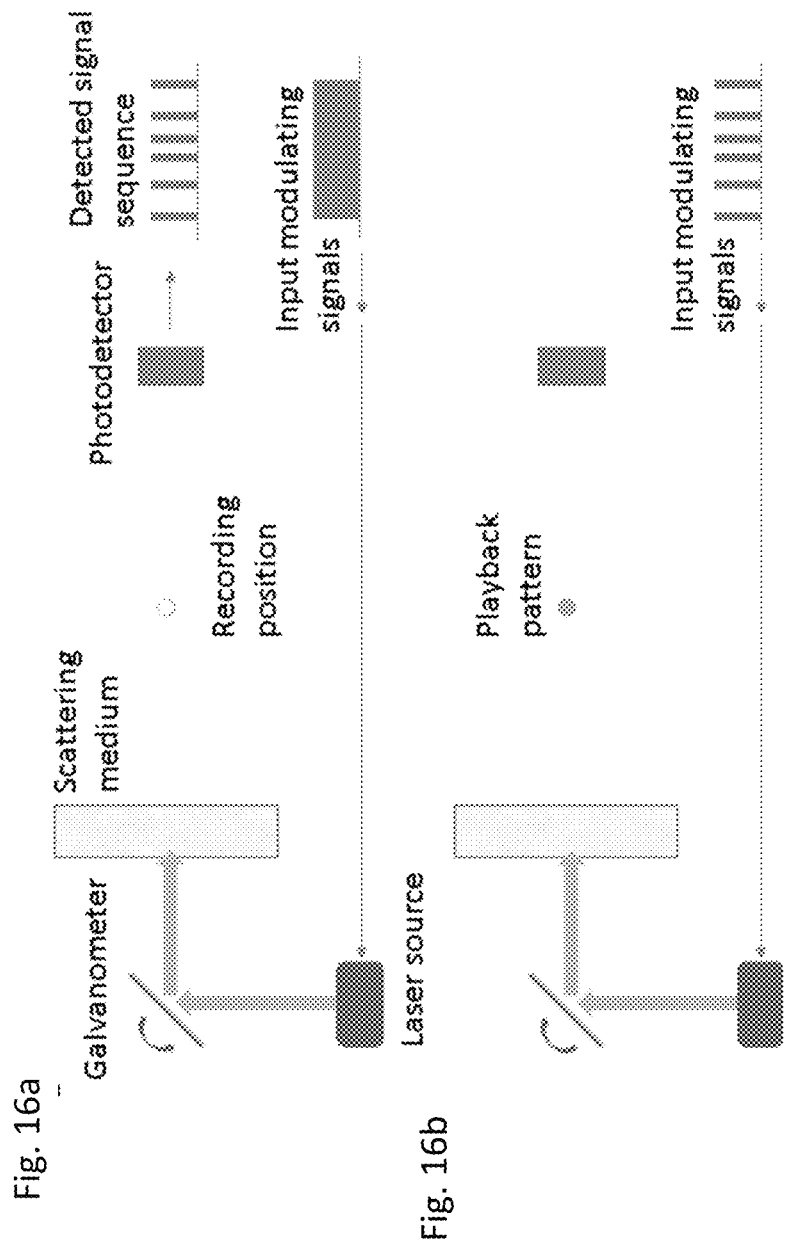

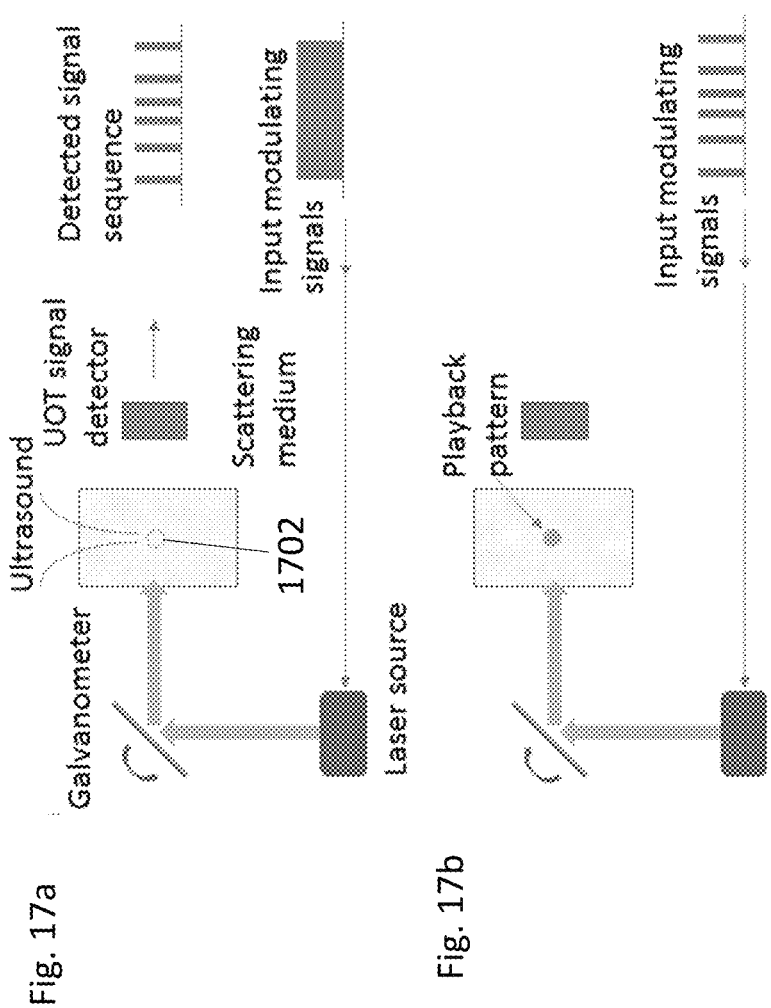

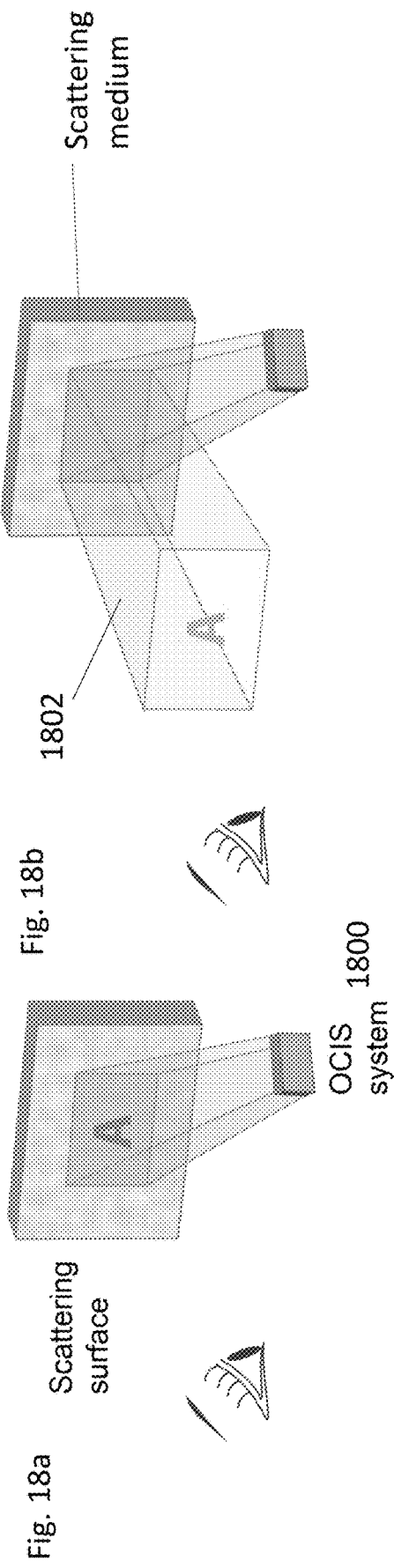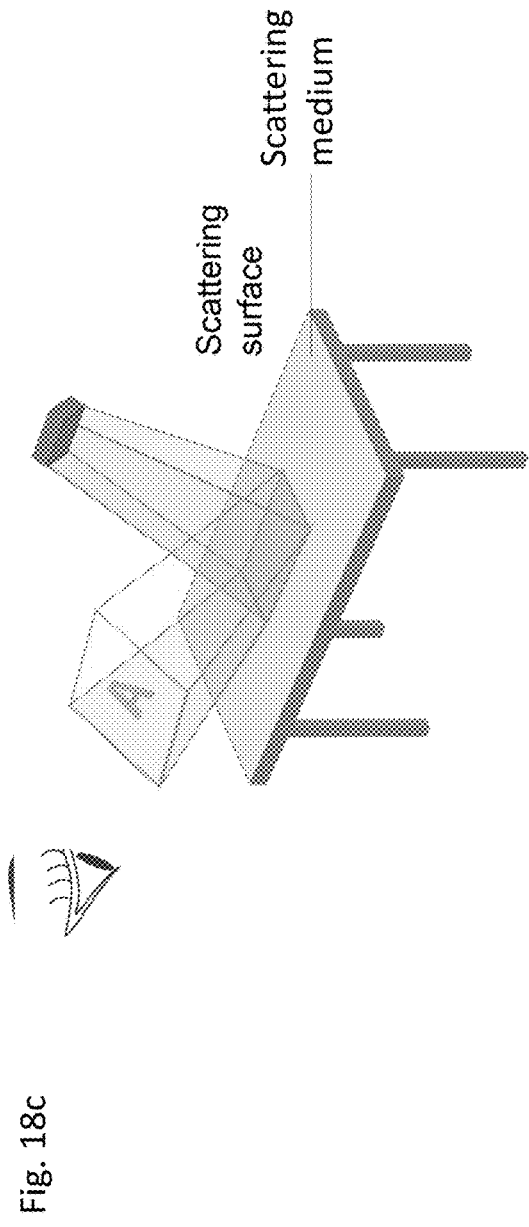
Fig. 18a
Fig. 18b
Fig. 18c

CONTROL LIGHT INTENSITY THROUGH SCATTERING MEDIA WITH SPECKLE INTENSITY SEQUENCING

CROSS REFERENCE TO RELATED APPLICATIONS

This application claims the benefit under 35 USC 119(e) of commonly assigned U.S. Provisional Patent Application Ser. No. 62/900,813, filed Sep. 16, 2019, by Haowen Ruan and Changhuei Yang, entitled "CONTROL LIGHT INTENSITY THROUGH SCATTERING MEDIA WITH SPECKLE INTENSITY SEQUENCING," (CIT-7856-P), which application is incorporated by reference herein.

STATEMENT REGARDING FEDERALLY SPONSORED RESEARCH AND DEVELOPMENT

This invention was made with government support under Grant No. NS090577 awarded by the National Institutes of Health. The government has certain rights in the invention.

BACKGROUND OF THE INVENTION

1. Field of the Invention

The present disclosure relates to devices for transmitting electromagnetic radiation through, or reflecting electromagnetic off, scattering media and methods associated therewith.

2. Description of the Related Art

Seeing through fog, looking around corners, and peering deep into biological tissue have traditionally been considered to be impossible tasks in optics. The main challenge is attributable to disordered optical scattering which scrambles the optical field of light from different optical paths. In the last decade, optical wavefront shaping has made great progress to control light through complex disordered scattering media for imaging and focusing[1-6]. This class of techniques first measures the optical phase or complex field of light from different scattering paths and then actively manipulates the output field by shaping an input wavefront. This active control of optical wavefronts has become a powerful and standard technique to manipulate light through disordered scattering media.

While different versions of optical wavefront shaping techniques have been developed, they almost always require phase measurement and spatial light modulation[1-6]. During the phase measurement process, interferometry of various forms is used to extract the phase information of the scattered light, either directly using holographic methods or indirectly using phase retrieval techniques. Then, knowledge of the phase information is used to display a pattern on a spatial light modulator which controls the propagation of light through many optical channels in parallel so that a desired optical pattern is obtained through the scattering medium by interference between all of the modulated optical paths. It is important to note that regardless of whether amplitude or phase modulation is used, traditional wavefront shaping techniques always exploit the phase relationship between different optical channels to form the desired output pattern since the output pattern is formed by interference.

This principle means that optical wavefront shaping requires knowledge of the phase relationship between the input and output planes of the scattering medium. Mathematically, the optical fields on the input plane and the output plane are related by a complex matrix called the transmission matrix[5,7]. Since a typical transmission matrix can contain millions of entries or more, measuring both the real and imaginary parts of all the entries is a challenging task since optical detectors measure only intensity information, requiring the use of interferometric techniques such as phase-shifting or off-axis holography. What is needed is a less complex method for wavefront shaping. The present disclosure satisfies this need.

SUMMARY OF THE INVENTION

Focusing light and imaging through scattering media like biological tissue has long been considered as an impossible task. Recent developed optical wavefront shaping techniques have shown much promise to solve this problem. This class of technique usually employs a spatial light modulator to control the optical modes on the input plane so that light from different scattering trajectories controllably interfere at the target location. Therefore, the wavefront shaping techniques require the knowledge of the transmission matrix or a part of it, the measurement of the optical phase with an interferometer, and a spatial light modulator for wavefront manipulation simultaneously. Here, we propose a new method to control the light intensity through scattering media without all these requirements, which will largely simplify the system and improve the operational speed.

In one or more examples, devices and methods described herein display a series of orthogonal optical fields on the input plane and records the corresponding optical speckle intensity in the region of interest on the output plane. This recorded intensity sequence encodes the intensity contribution of each input frame. By playing back a set of the input fields with weighted intensity based on the recorded sequence, we can create a targeted optical pattern through the scattering medium. Using fast optical scanning devices such as galvanometers, this technique can create a light focus through scattering medium within 100 µs, an order of magnitude faster than conventional wavefront shaping method.

However, devices and methods according can be embodied in many ways including, but not limited to, the following.

1. A device, comprising:
   a modulator transmitting a plurality of modulated electromagnetic fields to an input face of a scattering medium, wherein each of the modulated electromagnetic fields are scattered by the scattering medium to form a different speckle pattern;
   a detector measuring an intensity of each of the plurality of different speckle patterns outputted from the scattering medium, and
   a target associated with one or more speckles or one or more dark spots in one or more of the different speckle patterns; and
   a computer connected to the modulator and the detector, the computer:
   determining, from the intensity, one or more of the modulated electromagnetic fields comprising one or more target fields that are scattered to form the one or more speckles or dark spots; and
   indicating the one or more target fields to the modulator so that the modulator transmits only the one or more target fields to the input face (or transmits electromagnetic radiation consisting essentially of, or at least 95% of, the target fields).

2. The device of example 1, wherein:
the modulated electromagnetic fields are transmitted through the scattering medium to form the different speckle patterns, and/or
the modulated electromagnetic fields are reflected from the input face to form the different speckle patterns.

3. The device of example 1, wherein the plurality of modulated electromagnetic fields each comprise a different electromagnetic mode.

4. The device of example 1, wherein the modulator modulates an electromagnetic property of electromagnetic radiation to output the modulated electromagnetic fields comprising a sweep or scan over a range of different values of the electromagnetic property.

5. The device of example 1, wherein the modulator outputs at least one of:
a wavelength sweep so that each of the modulated electromagnetic fields comprise a different wavelength,
a polarization sweep so that each of the modulated electromagnetic fields comprise a different polarization,
a location sweep so that each of the modulated electromagnetic fields are transmitted to a different location on the input face, or
an angular sweep so that each of the electromagnetic fields comprise are transmitted at a different angle of incidence on the input face of the scattering medium to generate different speckle patterns.

6. The device of example 1, wherein:
the detector detects the different speckle patterns as a temporal intensity signal in response to the modulator outputting a stream or sequence of the modulated electromagnetic fields onto the input face of the scattering medium,
the computer identifies one or more times at which the temporal intensity signal has a desired intensity above or below a threshold value at the one or more speckles or one or more dark spots, and
the modulator transmits the target fields comprising only of a portion of the stream or sequence transmitted at the one or more times.

7. The device of example 6, further comprising:
a controller;
a laser transmitting electromagnetic radiation onto the modulator comprising a mirror, the mirror scanning the electromagnetic radiation across the input face so as to transmit each of the modulated electromagnetic fields to a different location on the input face; and wherein:
the controller instructs the laser to output the electromagnetic radiation a the one or more times so that the electromagnetic radiation only irradiates the locations on the input face where the intensity at the target was measured by the detector to be above or below the threshold value.

8. The device of example 1, wherein:
the detector detects the speckle pattern as a temporal intensity signal in response to the modulator scanning a stream of the modulated electromagnetic fields onto the input face of the scattering medium,
the computer:
uses the intensity to identify channels of the scattering medium,
selects a set of the channels forming a desired electromagnetic pattern at the target; and
the modulator streams the target fields to the set of channels.

9. The device of example 1, further comprising a display, a projector screen or display, or an augmented reality glass comprising the scattering medium, wherein the different speckle patterns comprise a reflection of the modulated electromagnetic fields from the scattering medium.

10. The device of example 1, comprising an imaging system wherein the target comprises an image being imaged by the imaging system.

11. The device of example 1, wherein the detector comprises an array of sensor pixels and the target comprises one or more of the sensor pixels.

12. The device of example 1, wherein the target comprises a guidestar within the scattering medium.

13. The device of example 1, wherein the scattering medium comprises biological tissue, fog, cloud, turbid water, a wall, a table, or any engineered scattering medium for which the target is not visible through the scattering medium due to scattering of electromagnetic radiation by the scattering medium.

14. The device of example 1, wherein the target comprises a focus of the modulated electromagnetic radiation.

15. The device of example 1, wherein:
the modulator comprises a spatial light modulator and the electromagnetic radiation comprises a pattern formed by activation of one or more pixels on the spatial light modulator, and
the target electromagnetic radiation comprises a target pattern.

16. The device of example 15, wherein the spatial light modulator comprises a digital micromirror device.

17. The device of example 1, wherein the desired intensity at the target is a null energy point (zero intensity).

18. The device of example 1, wherein the target comprises a focus of acoustic waves in the scattering medium and the detector measures the intensity of the one or more speckles formed by the scattered electromagnetic radiation that has been frequency shifted by acoustic waves.

19. A communications network comprising the device of example 1, further comprising:
a first transmitter at a first location and comprising the modulator;
a first receiver at a second location and comprising the detector and the target comprising a first target and a second target;
a second transmitter at the second location modulating second electromagnetic radiation with a message comprising as a series of bits comprising ones and zeroes, wherein:
the computer determines:
one or more of channels comprising one or more open channels through the scattering medium for which the intensity at the first target comprising the one or more speckles is greater than a threshold intensity; and
one or more of the channels comprising closed channels blocking the electromagnetic radiation such that the intensity at the second target comprises the one or more dark spots having zero intensity; and
the second transmitter transmits the electromagnetic radiation modulated with "ones" through one or more of the open channels associated with the first target and transmits the electromagnetic radiation modulated with the 'zeroes' through one or more of the closed channel associated with the second target.

20. A computer implemented method for transmitting electromagnetic radiation, comprising:
receiving an intensity of different speckle patterns measured in a detector, the different speckle patterns outputted from a scattering medium in response to modulated electromagnetic fields transmitted to an input face of the scattering medium from a modulator, wherein the scattering medium scatters the modulated electromagnetic fields incident on the input face to form the different speckle patterns;

determining, from the intensity, one or more of the modulated electromagnetic fields comprising one or more target fields that are scattered to form one or more speckles or dark spots in one or more of the different speckle patterns, the one or more speckles or dark spots associated with a target; and indicating the one or more target fields to the modulator so that the modulator transmits only the one or more target fields to the input face.

21. A computer implemented system, comprising:

a computer comprising one or more processors; one or more memories; and one or more programs stored in the one or more memories, wherein the one or more programs executed by the one or more processors:

receive an intensity of different speckle patterns measured in a detector, the different speckle patterns outputted from a scattering medium in response to modulated electromagnetic fields transmitted to an input face of the scattering medium from a modulator, wherein the scattering medium scatters the modulated electromagnetic fields incident on the input face to form the different speckle patterns;

determine, from the intensity, one or more of the modulated electromagnetic fields comprising one or more target fields that are scattered to form one or more speckles or dark spots in one or more of the different speckle patterns, the one or more speckles or dark spots associated with a target; and indicate the one or more target fields to the modulator so that the modulator transmits only the one or more target fields to the input face.

BRIEF DESCRIPTION OF THE DRAWINGS

Referring now to the drawings in which like reference numbers represent corresponding parts throughout:

FIG. 1a-1d. Optical intensity channels. FIG. 1a shows a coherent source or guidestar at position P1 on the target plane leads to a bright speckle at position P2 and a dark speckle at position P3. In the case of a bright speckle, the majority of the optical paths share similar phase (denoted by the same color) and thus relatively constructively interfere. In contrast, the optical paths leading to the dark speckle are out of phase (denoted by different colors). FIG. 1b and Fig. c show based on the time-reversal symmetry of optical propagation, a bright speckle at position P2 will also lead to a bright speckle at position P1 (FIG. 1b). However, a bright speckle at position P3 will not result in a bright speckle at position P1 due to destructive interference (FIG. 1c). FIG. 1d shows this phenomenon is interpreted in a picture of optical channels. An optical channel is established between position P1 and P2 for optical energy transmission while there is no optical channel between position P1 and P3.

FIG. 2a-2b show the principle of feedback-based OCIS. FIG. 2a1 shows a coherent light source scans across the input plane of the scattering medium over time, resulting in time-varying intensity signals at the target spot on the target plane. At another spot (denoted by a triangle), the signals are uncorrelated with those at the target spot due to the random scattering of the light through the sample. These time-varying signals allow us to map the optical channels between the input plane and the target plane. FIG. 2a2 shows by injecting light into the channels that connect to the target spot, a focus pattern is formed at the target spot while other spots on the target plane receive less light on average. FIG. 2b shows matrix representation of the feedback-based OCIS. (FIG. 2b1 shows the incident optical mode sweeps through space over time, and can be represented by an identity matrix A. Its interaction with the scattering medium is represented by multiplying the intensity transmission matrix S, resulting in time-varying speckle patterns on the output. The measurement of the time-varying speckles at the target position is equivalent to taking one column of the intensity matrix B. FIG. 2b2 shows during display, the binarized output selects a number of rows of S as output. The integration of the selected output rows over time results in an optical focus pattern at the target position.

FIGS. 3a1, 3a2, 3b, 3c, 3d1, 3d2, 3e1-3e2 show results of the feedback-based OCIS. FIG. 3a shows simplified system setup. FIG. 3a1 shows Measurement. A galvo mirror was used to steer light into different channels of the scattering sample. As the galvo mirror scanned forward, the photodetector measured the temporal signal that fluctuated as light coupled into different channels. FIG. 3a2 shows the measured signal was binarized and used to modulate the intensity of the laser in a time-reversed order as the galvo mirror scanned backward. In this case, we can measure the optical channels and inject light into the high-throughput channels during a galvo mirror round trip. FIG. 3b shows at different sample decorrelation times, optical spots were created in free space and captured by a camera with an exposure time of 125 µs. The CNRs for τ from 500 ms to 1 µs are 12.6, 12.3, 9.3, 6.5, 5.1 and 0.3. Scale bar: 20 µm. FIG. 3c shows CNR as a function of the sample decorrelation time. FIG. 3d shows Feedback-based OCIS for null energy display. FIG. 3d1 shows by injecting light into the low-throughput optical channels instead of high-throughput ones, we can obtain a null energy spot on the target plane. FIG. 3d2 shows control image. By sending light into randomly selected channels, no null energy spot was observed. Scale bar: 20 µm. FIG. 3e1 shows Line plots of the arrow-indicated lines in (b, τ=500 ms and 1 µs), normalized by the mean value of the background. FIG. 3e2 shows line plots of the arrow-indicated lines in (FIGS. 3d1 and 3d2), normalized by the mean value of the background.

FIG. 4a-4d shows Optical intensity transposition. FIG. 4a shows the principle of optical intensity transposition. FIG. 4a1 shows Light emitted from a coherent light source at the target plane traverses the optical channels to the input plane. By measuring the light intensity of the transmitted light as a function of space, we can obtain a spatial map of the optical channels. FIG. 4b2 shows by sending light back through the high-throughput channels and linearly combining the transmitted light, we can obtain a focus pattern at the source location. FIG. 4b shows experimental setup. Similar to optical phase conjugation, the retroreflecting process can be separated into two steps. FIG. 4a1 shows recording. A point source transmitted light through the scattering medium and a photodiode measures a one-dimensional speckle pattern during one galvo mirror sweep. FIG. 4a2 shows Playback. The measured signal is time-reversed and then modulates the laser on the input side as the galvo mirror scans backward. An optical spot is created at the position of the initial point source. FIG. 4c shows Matrix representation of optical intensity transposition. During recording (FIG. 4c1), a guidestar selects a column of the intensity transmission matrix as a time-varying intensity output, which is then binarized. During playback (FIG. 4c2), the binarized signal is used to select the corresponding rows of the intensity matrix, whose sum leads to a bright optical spot at the guidestar position. FIG. 4d shows Experimental results. An optical spot pattern was imaged on a camera with optical intensity transposition (FIG. 4d1), while no bright spot was observed in the control experiment where we disabled the synchronization between the playback sequence and the galvo mirror (FIG. 4d2). Scale bar: 20 µm.

FIG. 5a-5f Secure communication with OCIS. FIG. 5a shows conceptual illustration. OCIS enables secure free-space optical communications between communication parties Alice and Bob. FIG. 5a1 shows Alice establishes optical channels between Alice and Bob by sending a laser pulse through the scattering medium. Bob measures the resultant speckle intensity pattern on the remote end to reveal the optical channels between Alice and Bob. FIG. 5a2 shows to send a binary message to Alice, Bob streams spatially incoherent optical pulses through different channels of the scattering medium, e.g., logical ones to randomly selected open channels and logical zeros to randomly selected closed channels. As a result, Alice receives a matched message while a third person Chuck receives a random message because the channels between Bob and Chuck are uncorrelated with those between Alice and Bob. FIG. 5b shows experimental demonstration of the OCIS-based free space secure communication. FIG. 5b1 shows a laser beam transmits through a local diffuser and a remote diffuser. A photodetector array at the remote end measures the resultant speckle pattern as the map of the optical channels. FIG. 5b2 shows an intensity modulator array is used to route the optical pulses to different channels based on the message and the measured channel map. Two photodetectors on the local side record the returned optical pulses. One of the photodetectors is conjugated to the laser while the other one is placed elsewhere. FIG. 5c-f shows Experimental results. FIG. 5c shows Original binary data. FIG. 5d shows Raw data received by the conjugated photodetector. FIG. 5e shows Binarized data of FIG. 5d. FIG. 5f shows Raw data received by the neighboring photodetector.

FIG. 6a-6d. Simulation results for comparison of the metrics, peak to background ratio (PBR) and contrast of noise ratio (CNR), which evaluate the quality of a focus pattern. FIG. 6a shows In optical wavefront shaping, at low PBR, e.g. PBR=2, the peak is immersed into the background of fully developed speckles, where the standard deviation of the speckle intensity is the same as its mean. In this case, CNR=PBR−1=1. FIG. 6b shows For the same PBR, the time-averaged pattern created by OCIS shows a prominent peak as the variation of the background is much lower, resulting in a higher CNR, e.g. CNR=20 (~1000 controllable modes). FIG. 6c shows To obtain the same CNR as the pattern formed by OCIS, the PBR of the focus formed by the wavefront shaping techniques needs to increase to 21. FIG. 6d shows the pattern in FIG. 6b is rescaled to help visually compare to the pattern in FIG. 6c. As shown in FIG. 6c and FIG. 6d, as long as the CNR is the same, the visibility of the peak is very similar although they have a very different PBR. Therefore, CNR is a more useful metrics for OCIS.

FIG. 7a-7d. Experimental Setups. FIG. 7a shows Feedback based OCIS setup. FIG. 7b shows Optical intensity transpose setup. FIG. 7b1 shows recording; FIG. 7b2 shows playback. FIG. 7c shows Setup for direct imaging through scattering media. Abbreviations: AOM, acousto-optic modulator; BD, beam dump; BS, beam splitter; CAM, camera; DMD, digital micro-mirror device; FB, fiber; G, ground glass diffuser; GM, galvanometer mirror; HWP, half wave plate; L, lens; PD, photodetector; PMT, photomultiplier tube; RD, rotating diffuser; TP, target plane. FIG. 7d shows another set up.

FIG. 8a shows Simplified system setup. As the galvo mirror scanned forward, the photodetector measured the temporal signal which was then binarized by the comparator. An FPGA, which was synchronized with the galvo mirror, received the digital signal and output the time-reversed signal that modulated the laser as the galvo mirror scanned backward. FIG. 8b shows Illustration of the signals during one galvo mirror round trip.

FIG. 9a-9c. Experimental signal traces from the feedback-based OCIS. FIG. 9a shows a raw signal output from the photodetector during measurement. FIG. 9b shows a binarized signal output from the comparator during measurement. FIG. 9c shows a photodetector output signal during display. To provide a clearer visual comparison, we time-reversed this output signal again to match the timing.

FIG. 10a shows CNR optimization mode based on Equation S7 and Equation S8. FIG. 10b shows PBR optimization mode based on Equation S9 and Equation S10.

FIG. 12a shows with static samples. FIG. 12b shows with samples of 1 ms decorrelation time in a negative exponential decorrelation model. See Supplementary Note 2 for detailed analysis.

FIG. 13a-13d. Direct imaging through a thin scattering medium with OCIS. (a) Experimental setup. This procedure can be separated into two steps. FIG. 13a1 shows Measurement. This procedure is the same as the recording of the intensity reflection method described above. An optical spot was created on the target plane and a binarized speckle intensity is measured sequentially on the detector plane during a sweep of the galvo mirror. FIG. 13a2 shows Direct observation. By using this signal to modulate the laser that illuminates a transmission object on the target plane, one can directly observe the object as the galvo mirror synchronizes with the modulated illumination. The method utilizes the angular memory effect of the thin scattering medium, where a tilted optical field incident to the thin scattering medium results in a tilted optical field on the other side. Therefore, the measured signal is also applicable to the neighboring points and enables direct observation of the object with only one measurement. FIG. 13b shows Optical diagram of the imaging process. FIG. 13b1 shows Light from an object couples to different high-throughput channels over time and the transmitted light is directed to a spot to form a PSF of the imaging system. FIG. 13b2 shows Based on the optical memory effect, a neighboring spot within the memory effect range also forms an image at the imaging plane. FIG. 13c shows Equivalently, OCIS and the scattering medium serves as an imaging system and one can see through the scattering medium directly. FIG. 13d shows An image of the object was formed through the scattering medium and captured by a camera on the detector plane. Scale bar: 10 micrometers.

FIG. 14a shows In free space, scatterers spreads light to other directions. FIG. 14b shows In waveguide geometry, light can be coupled out of an optical fiber.

FIG. 15a-15c. Principles of the speckle intensity sequencing method. FIG. 15a shows A set of speckle images that are obtained as laser beam transmits through a scattering medium. By a selecting a certain subset of the speckle patterns (indicated by the arrows), an optical pattern such as a focus (FIG. 15b) or a letter "A" (FIG. 15c) can be created.

FIG. 16a-16b. An example of the experiment setup. FIG. 16a shows Speckle intensity sequencing. A laser beam is directed to the scattering sample with different incident angles using a galvanometer. A photodetector (e.g. a photodiode or a camera) is used to record the light intensity at the region of interest over time, resulting in a signal sequence. FIG. 16b shows By modulating the laser source with the signal sequence in time-reversed order as the galvanometer scans back, a targeted playback pattern can be observed at the region of interest.

FIG. 17a-17b. Example setup of ultrasound assisted optical focusing inside scattering media. FIG. 17a shows ultrasound modulated signal sequencing. A laser beam is directed to the scattering sample with different incident angles using a galvanometer. An ultrasound modulated light detector is used to record the intensity of ultrasound modulated light at the ultrasound focus over time, resulting in a signal sequence. FIG. 17b shows By modulating the laser source with the signal sequence in time-reversed order as the galvanometer scans back, an optical focus can be created at the ultrasound focus inside the scattering media.

FIG. 18a-18c illustrates using the OCIS device to control reflection from the scattering medium, e.g. in the area of display, wherein FIG. 18a illustrates reflection of a scattering medium, FIG. 18b illustrates OCIS control of electromagnetic radiation reflected off a scattering medium comprising a reflection display (e.g., a wall), and FIG. 18c shows OCIS control of electromagnetic radiation reflected off a table (e.g., comprising a reflection display).

DETAILED DESCRIPTION OF THE INVENTION

Figures 10A, 10B:
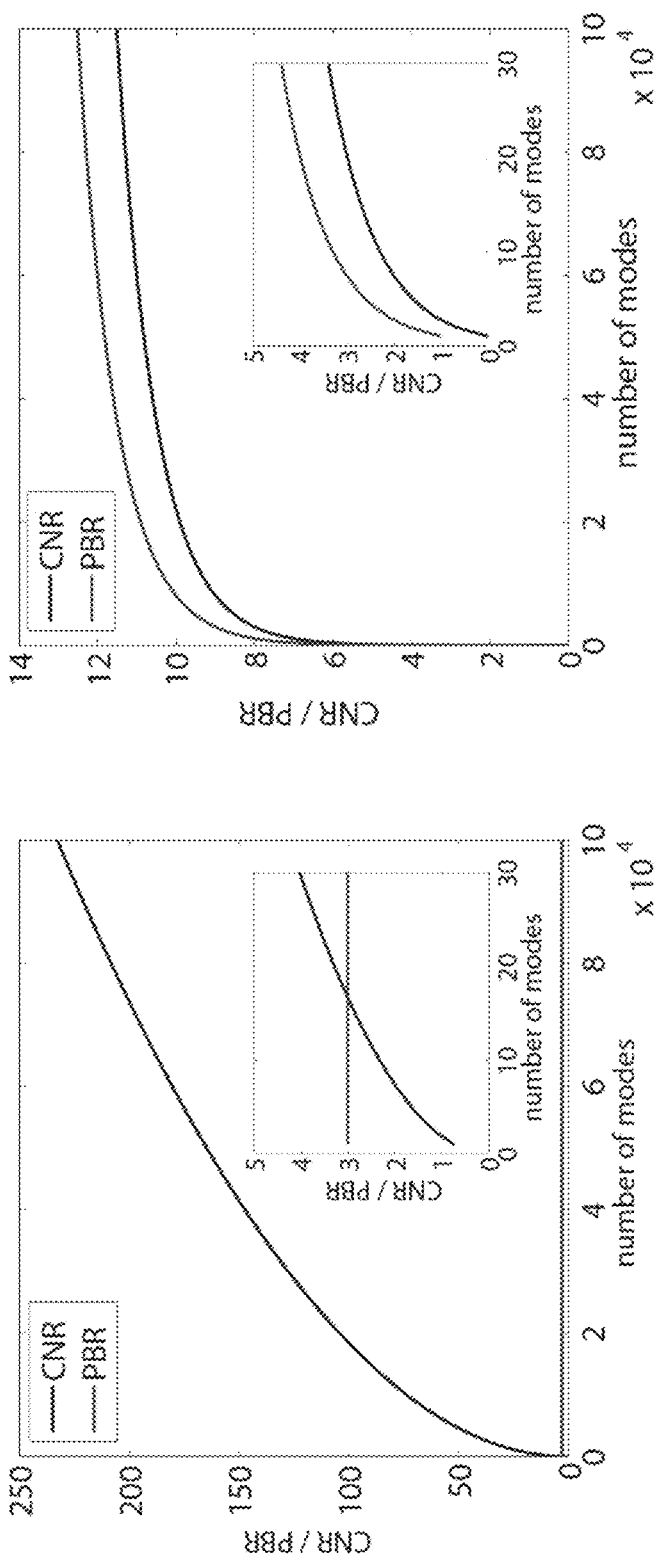
FIG. 10a-10b. CNR and PBR as a function of number of controllable modes.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

TECHNICAL DESCRIPTION

Measuring the phase relationship between different channels for wavefront shaping can be complex undertaking. Conventional wisdom assumes knowledge of the optical phase (and actively measuring and re-aligning the phase of the light from individual paths) is a prerequisite for manipulating light through scattering media so that wavefront shaping can effectively transform a scattering medium into an optical lens. The present disclosure reports on surprising and unexpected findings that challenge this assumption. We report a new optical approach that allows us to manipulate light through complex media without knowledge of the complex transmission matrix or the use of wavefront shaping. This method characterizes the optical intensity channels of the scattering medium by measuring the intensity of the optical speckle pattern transmitted through the scattering medium. Once we obtain the map of the optical intensity channels, we can control the light intensity and transmit information through the scattering medium using a linear combination of the modulated light through these optical channels. We call this method optical-channel-based intensity streaming (OCIS). Since phase information is not required, OCIS simplifies the complex field measurement to a direct intensity measurement. This new concept expands our understanding of light control through scattering media and introduces new strategies to overcome and use optical scattering. In practice, since no interferometer, phase reconstruction, or spatial light modulation is required, the approach is remarkably simple to implement and can operate at high speeds. The reference-free feature of OCIS is useful in practical applications such as remote communication through scattering media.

Principles

To help understand the principles of OCIS for optical control through scattering media, let us imagine a scenario where a coherent light beam from a point source at position P1 is incident on and transmits light through a scattering medium (FIG. 1a). A laser speckle pattern will develop behind the scattering medium as a result of the mutual interference of multiple scattering paths[12]. The speckle intensity is randomly distributed, and let us assume that a bright speckle is developed at position P2 and a dark speckle is developed at position P3 (FIG. 1a). Whether a speckle is bright or dark depends on the degree of alignment (i.e., the degree of constructive or destructive interference) between the phasors representing the field contribution from different optical paths through the medium. The bright speckles result from situations where the phasors are more strongly aligned than on average (i.e., relatively constructive interference), forming a longer-than-average resultant phasor, and the dark speckles from the situations where the phasors are more weakly aligned than on average (i.e., relatively destructive interference), forming a shorter-than-average resultant phasor.

In the example presented in FIG. 1a, the relatively constructive interference occurring between light from the majority of optical paths that connect positions P1 and P2 forms a bright speckle at P2, whereas the relatively destructive interference of light occurring between the different paths that connect P1 and P3 forms a dark speckle. The time-reversal symmetry of optical propagation also means that if we place the light source at position P2, the light will follow the same trajectories to reach position P1 (FIG. 1b). Since the phase relation between these optical paths is maintained, relatively constructive interference occurs at position P1. Similarly, if we move the light source to position P3, destructive interference occurs at position P1 because the phase relationship between the optical paths remains the same regardless of the propagation direction of the light (FIG. 1c). We can abstract the above analysis to a picture of optical channels (FIG. 1d). An open optical channel is established between the position P1 and P2 while the optical channel connects position P1 and P3 is closed. We can then generalize this relationship to the entire target plane where the intensity of a speckle maps to the throughput of the associated channels. The concept of optical intensity channels forms the foundation of OCIS, which allows us to manipulate light through scattering media by learning and modulating the intensity of light through the optical channels.

It should be noted that the concept of optical intensity channels here differs from the channels described in optical wavefront shaping theory[13] since here knowledge of optical intensity alone is required, instead of information about the complex field. Mathematically, we can describe OCIS with an intensity transmission matrix. This mathematical theory mirrors the complex optical field transmission matrix theory that is extensively used in wavefront shaping methods[5,7].

To understand OCIS in the framework of an intensity transmission matrix, we start by examining the complex optical field transmission matrix mathematical framework[5,7]. In this case, the optical fields on the input plane and the target plane can be discretized into complex row vectors u and v, respectively, and connected by a transmission matrix T through the equation v=uT. The optical field on the target plane is a linear transform of the field on the input plane. However, the intensity on the target plane, which is of interest in most applications, is not linear with respect to the intensity of the shaped optical field.

OCIS aims to simplify this nonlinear relationship by directly connecting the input intensity to the output intensity in a linear form through an intensity transmission matrix S of the form $$b=aS, \quad (1)$$

where a and b are row vectors denoting the intensity of the optical patterns on the input plane and output plane, respectively. Each element of a and b represents the intensity value of an optical mode. This equation is valid if the input modes are spatially incoherent with each other so that the intensity of each output mode is a linear combination of the intensity values of these input modes. In this case, The (i,j)th element of S is equal to the magnitude square of the (i,j)th element of T, and thus all elements of S are real and non-negative. While complex transmission matrix theory interprets light propagation through scattering media on a fundamental level, the intensity transmission here serves as an intuitive and efficient tool to analyze linear and incoherent operation.

There are two primary ways by which we can satisfy the condition that the spatial modes on the input plane are spatially incoherent and do not mutually interfere with each other. The most direct way is to use a spatially incoherent light source on the input side. Alternatively, we can sequentially illuminate each input spatial mode. In this case, time separation can also guarantee that cross-modal interference does not occur. In our experiment, we demonstrated the use of these two approaches to linearly and incoherently operate on the intensity channels. In the following sections, we will demonstrate a series of experimental implementations of OCIS to overcome optical scattering and transmit information through disordered scattering media.

Feedback Based OCIS

Here we apply the principle of OCIS with a feedback mechanism to form a focus pattern through a scattering medium, an important evaluation of the ability of this technique to overcome optical scattering. The requirement for a feedback mechanism here shares similarity with feedback-based wavefront shaping[14]. The implementation of feedback-based OCIS can be divided into two steps, measurement and display. During the measurement process, OCIS aims to find the optical channels between the input plane and the target spot. In this case, one can use a CW laser source to illuminate the scattering medium with different optical modes, e.g. scanning spatially over time as shown in FIG. 2a1. By simply measuring the optical intensity feedback as the laser beam scans, one can learn the optical channel mapping between the scanning position on the input plane and the target spot. During display, we simply inject light only into the optical channels that connect the input plane and the target spot as shown in FIG. 2a2. Although part of the light also couples to other channels that are connected to other positions on the target plane, the total light intensity on these positions is on average lower than that on the target spot.

We now use the intensity transmission framework to analyze feedback-based OCIS. During the measurement step, we sequentially send in the basis input vectors, which form a matrix A (FIG. 2b1, left matrix). In our case, we input single modes (i.e., $A_i=\delta[i]$), where $A_i$ denotes the ith row vector of A, and $\delta[i]$ is a delta row vector with a nonzero value at the ith element (e.g., $A_1=[1,0,0,\ldots]$). As a result, by collecting the transmitted intensity patterns over time, we obtain an output matrix B (FIG. 2b1, right matrix) that maps to the intensity transmission matrix S. The time-encoded intensity measured at the jth location on the target plane indicates the throughput of the optical channels that connect the corresponding input mode to this location.

To enhance the temporal average intensity at the jth location on the target plane, we select a subset of the row vectors of A where each row vector $A_i$ connects to a high-throughput channels to the jth column of B. We denote the set of row vector indices obtained using the feedback-based OCIS as $C_{FB}$. We then sequentially send light to these channels and integrate the output intensity patterns (FIG. 2b2) to avoid mutual interference between different channels. Mathematically, the target pattern formed by feedback-based OCIS is given by $$b_{FB} = \sum_{i \in C_{FB}} B_i = \sum_{i \in C_{FB}} (A_i S). \quad (2)$$

Mathematically, Equation (2) can be further rewritten as $$b_{FB} = \sum_{i \in C_{FB}} (A_i) S = a_{FB} S. \quad (3)$$

where $a_{FB}$ is the summation of the input mode intensities in time. This equation is in agreement with Equation (1), which justifies the use of temporal separation approach to realize the requirement of spatial incoherence.

With this mathematical framework in place, we can quantitatively evaluate the performance of OCIS based on speckle statistics. The contrast-to-noise ratio (CNR), which is defined as the ratio between the background-subtracted, time-averaged, spatial-peak intensity and the standard deviation of the background, is a reasonable metric because it evaluates both the peak intensity of the temporal average pattern and the fluctuation of its background. Assuming the instantaneous speckle patterns, i.e, the rows of the intensity transmission matrix, are fully developed[12], and the total number of uncorrelated speckle patterns that the OCIS system can measure and control is N (i.e. the number of rows in S), the expected CNR of the optical spot pattern is given by $$CNR = \sqrt{N} \exp\left(-\frac{I_t}{2\mu}\right)\frac{I_t}{\mu}, \quad (4)$$

where $I_t$ is the intensity threshold and $\mu$ is the mean intensity of the speckle (i.e., the mean of the intensity transmission matrix S). A step-by-step derivation of Equation (4) is provided in Supplementary Note 1. As the total number of measured frames N increases, the background becomes more uniform, the CNR increases, and the resulting optical spot becomes more pronounced. Therefore, this metric indicates the ability of OCIS to overcome optical scattering and to recover optical information through scattering media.

Another metric that is widely used in optical wavefront shaping is peak-to-background ratio (PBR) or intensity enhancement factor, which is defined as the ratio between the peak intensity and the mean of the background. The PBR of OCIS is given by $$PBR = 1 + \frac{I_t}{\mu}. \quad (5)$$

A detailed derivation of Equation (5) is included in Supplementary Note 1. As shown in Equation 4 and 5, we can choose the intensity threshold $I_t$ to optimize either CNR or PBR (See Supplementary Note 1).

In wavefront shaping for optical focusing through scattering media, the PBR and CNR of the focus are equal except for a constant offset of 1 (PBR=CNR+1), for fully developed background speckle patterns. This fixed relationship stems from the fact that the background follows well-defined speckle statistics, where the mean and standard deviation of the background are the same value. In comparison, the PBR and CNR are quite different quantities in OCIS because the background mean is decoupled from its variance. A more detailed discussion of CNR and PBR can be found in FIG. 6. Different with wavefront shaping, both CNR and PBR are required here in OCIS to comprehensively characterize the quality of the focus pattern. CNR indicates the peak value and background variance, which determines the visibility of the focus pattern, while PBR indicates the energy enhancement on the targeted optical spot. For OCIS, CNR provides a better gauge of the signal-to-noise ratio than PBR in strong light scenarios (See Supplementary Note 1 for more details). Since most of our experiments were performed at high light intensity levels, we chose to optimize CNR instead of PBR for optimal performance. We do note that in low light scenarios, PBR becomes the more relevant gauge of the signal-to-noise ratio for OCIS.

We next report our experimental findings on the controlling capability and speed of feedback-based OCIS. A simplified signal diagram is shown in FIG. 3a and the detailed experimental setup is described in the Methods section and shown in FIG. 7a. During measurement, a CW mode laser source illuminates the scattering medium (a ground glass diffuser, see Methods). We use a single photodetector with an active area comparable to the size of a single speckle grain to measure the temporal speckle intensity of the target point at the target plane during one galvo mirror sweep of time duration t (FIG. 3a1). We can then apply an intensity threshold to the time trace and identify a subset of optical channels that contribute bright speckles at the target location. During the display step (FIG. 3a2), we use this information to selectively turn on the laser illumination only at time points when this subset of speckle patterns is reproduced during a repeated galvo mirror scan. Since all the selected speckle patterns show a brighter-than-threshold speckle at the target point, the temporal average optical intensity at the target point can then be expected to be higher on average than that of the background. Although the instantaneous intensity may fluctuate within the time period of t, i.e. the galvo mirror single trip scan duration, the temporally averaged optical spot can, nevertheless, effectively fulfill the role of a wavefront-shaping-based focused spot in many applications such as imaging or target localization, as long as t is shorter than 1) the decorrelation time of the scattering medium and 2) the application's signal integration time frame.

Because only intensity information is measured and modulated, the implementation of feedback-based OCIS can be extremely simple and fast. We used a comparator circuit to identify the high intensity speckles measured by the photodiode and streamed the digital signal (FIGS. 8 and 9) to a field programmable gate array (FPGA) that was synchronized with the galvo mirror. During the display process, a last-in-first-out (LIFO) module in the FPGA was used to time-reverse and output the signal as the galvo mirror swept back. In this case, the output signal from the FPGA modulated the laser. In our experiment, a galvo mirror of 4 kHz was used, meaning that an optical spot was created within 250 μs. This all-hardware-based OCIS system is able to measure and control $8 \times 10^3$ modes per millisecond (see Supplementary Note 2 for detailed analysis).

A camera with exposure time covering a galvo mirror one-way sweep (125 μs) was triggered to capture the patterns on the target plane. FIG. 3b shows the patterns captured by the camera at various speckle decorrelation times. To demonstrate the performance of this technique in the presence of fast speckle decorrelation, we tuned the speckle decorrelation time by moving the scattering medium at controllable speeds. As shown in FIG. 3b, the visibility of the optical spot becomes lower as the speckle decorrelation time decreases. To quantify the CNR as a function of speckle decorrelation time, we calculated the CNR of the patterns and plotted them over the decorrelation time as shown in FIG. 3c. The CNR drops to 50% of the maximum at a decorrelation time of ~200 μs, matching well with the period of the galvo mirror, 250 μs.

The ability of OCIS to form a focus pattern can be generalized to arbitrary intensity control through scattering media by modulating the light intensity through the optical channels. One notable scenario is the generation of a null energy spot at a target point. In principle, the generation of a null energy spot through wavefront shaping is possible[10,11]. Practically, a wavefront-shaping-based null energy spot has very limited practical utility—a natural speckle field is populated with numerous null spots due to deconstructive interference and an engineered null energy spot would not have a significant distinction from those spots. OCIS has an intrinsic capability to form a null energy spot of high visibility because it incoherently sums up speckle patterns and provides an averaged flat background.

Implementation-wise, the generation of a null energy point with OCIS simply requires that we negate the high-throughput optical channels between the incident plane and the target spot and send light to the low-throughput channels. We demonstrate this effect in the following experiment. Similar to the feedback-based OCIS for forming an optical spot through a scattering medium, we measured the binarized temporal speckle intensity through a scattering medium (see Methods) during the measurement step. Unlike the display process to form an optical spot where we chose the bright speckles, here we inverted the measured logic signals to choose the dark speckles, which subsequently modulated the laser source as the synchronized galvo mirror scanned backward. As such, a null energy spot was observed on the time-integrated pattern with a PBR of $5.0 \times 10^{-2}$ and a CNR of −5.1 (FIG. 3d1, FIG. 3e2). To capture a control image, we randomly selected a subset of speckle patterns during display, and no null energy spot was observed (FIG. 3*d*2, FIG. 3*e*2). A quantitative derivation of the CNR and PBR of null energy spot patterns is included in Supplementary Note 1.

The process of speckle pattern selection and summation here shares similarity with the operational process of ghost imaging[15]. However, there are fundamental distinctions between these two methods. First, ghost imaging measures speckles in free space and is not related to the optical channel theory while OCIS is a method to overcome or utilize disordered scattering. Second, ghost imaging reconstructs images computationally while OCIS is able to physically form images (See Supplementary Methods—Image transmission through scattering media with OCIS).

Example: Optical Intensity Transposition

The ability to measure light transmitted from a point through a scattering medium and to find an optical solution that can send light back through the scattering medium to the original point (e.g. FIG. 4*a*) is highly sought for practical applications. In combination with guidestar techniques[3], this ability can potentially allow controlled concentrating of light energy within and information transmission through a scattering medium. To date, optical phase conjugation is the dominant wavefront shaping approach to perform such a function[16,17]. As such, the phase conjugation operation has long been assumed to be vital for retroreflecting light through or inside scattering media.

Surprisingly, OCIS provides an alternative and simple approach to accomplish the same objective—we name this approach optical intensity transposition. Moreover, OCIS accomplishes this objective without requiring phase measurements or the use of phase conjugation. To better understand the approach, we refer back to the intensity transmission matrix theory. From this theory, we can see that the index set $C_{FB}$ or the target column vector of the intensity transmission matrix records the throughput of the optical channels between the input plane and target spot. Interestingly, the feedback-based OCIS method is not the only way to obtain this information about the optical channels. One can also utilize a point source on the target plane, which can be formulated as a delta column vector $\hat{\delta}[j]$ (FIG. 4*c*1, right column; the symbol ^ denotes column vector), to probe the target column of the intensity transmission matrix, that is $\hat{S}_j = S\hat{\delta}[j]$, in which $\hat{S}_j$ is the jth column of the intensity transmission matrix $S$. In this case, we can directly obtain the target column $\hat{S}_j$ on the input plane (FIG. 4*c*1) as the response of the delta function on the target plane. By measuring and thresholding this column vector, we are able to obtain the index set Con with the optical intensity transpose method, which is the same as the $C_{FB}$. Once we have the information about the optical channels, we can follow the same procedure as feedback-based OCIS to control light intensity through scattering media, e.g. forming an optical spot on the target plane (FIG. 4*c*2), which is mathematically described in Equation (2). Interestingly, we can also playback all the modes simultaneously provided that they are spatially incoherent. Similar to Equation (3), the summation of the selected intensity patterns on the input plane, $$a_{OIT} = \sum_{i \in C_{OIT}} A_i,$$

is the transpose of the binarized column vector $\hat{S}_j$, justifying the name of optical intensity transposition. As a comparison, optical phase conjugation plays back the conjugate transpose of the measured column of the complex transmission matrix.

We demonstrate this concept by the following experiment. Similar to optical phase conjugation, optical intensity transposition also starts with a coherent light source or a guidestar point[3] on the target plane behind the scattering medium (FIG. 4*b*1). The resulting optical pattern on the detector plane after scattering by the scattering sample carries important information about the scattering characteristics of the medium. Instead of recording the complex field or its phase map, here we only record the intensity information. In this case, we scan a galvo mirror placed at the Fourier plane of the detector plane to convert a spatial intensity pattern into a temporal intensity signal and record the signal using a photodetector (FIG. 4*b*1). See Methods and FIG. 7*b* for more details on the setup. In the playback step, instead of using a spatial light modulator to display a conjugated optical wavefront, here we simply turn on the light source when the backward-scanning galvo mirror rotates to the positions where bright speckles were measured on the detector plane during recording. This process can be easily achieved by modulating the light source with the time-reversed signal as the galvo mirror scans backward (FIG. 4*b*2). By integrating the playback pattern over the backward scanning period on a camera, we observe an optical spot on the camera (FIG. 4*d*1). In other words, we "refocused" light through the scattering medium to the origin by simply reflecting the light back without the need to consider and manipulate the phase information. As a control experiment, we mismatched the timing between the phase of the galvo mirror and the modulation signal and captured a control pattern as shown in FIG. 4*d*2.

It is worth noting that wavefront shaping with amplitude only modulation such as with digital micromirror devices (DMD) can also include similar operations—intensity measurement, thresholding, and modulation[18]. However, these two methods are different on a fundamental level. Binary amplitude modulation still exploits interference between the modulating pixels and therefore, is still a phase-based approach. As phase and interference are involved, a reference beam, parallel spatial modulation, and finely-tuned alignment are all necessary with DMD-based phase conjugation. The underlying principle of OCIS is based on the linear operation on the intensity instead of the complex field in wavefront shaping including DMD-based phase conjugation.

Example: Secure Optical Information Transmission Through Scattering Media

Disordered optical scattering scrambles the propagation directions of photons. In optical imaging, this effect broadens the point spread function and prevent optical information to be localized or resolved precisely through scattering media. In free-space optical communication, the spreading of the photons due to optical scattering prevents the information to be confined privately or delivered specifically. In this case, the optical scatterers act as tiny "beam splitters" that duplicate and broadcast the optical information to the public.

Conventionally, a separate key is used to secure information transmission. In this case, a private channel is first established to allow the communication participants to share the key. The key is then used to encrypt the information to be transmitted in a public channel. Only the receivers with the key can decode the encrypted information. Of particular interest to mention here are the previous works on using optical approaches to generate random keys[19-22].

Recently, optical wavefront shaping based approaches have been demonstrated to address the non-specific transmission of optical information due to optical scattering. Instead of using a separate digital key for encryption, this method takes advantage of the random scattering itself to "encrypt" to optical information[23]. In this case, the scrambled optical information due to optical scattering can only be recovered by the measured complex transmission matrix of the scattering.

Here, we demonstrate one potential use of OCIS in optical communication through scattering media. There are two main advantages of using OCIS for private communication with the presence of optical scattering. First, a separate random key generator and a private channel are not required although they are compatible with OCIS for an additional layer of security. Second, prior measurement of the complex transmission matrix is not required either, which is important for remote communications where complex field measurement is challenging.

To understand the principle of OCIS based information transmission through scattering media, we consider a scenario where person A (Alice) and person B (Bob) try to communicate to each other in a non-line-of-sight environment such as through fog, through turbid water, or around the corners. the scattering medium can also take the form of a multimode fiber. Similar to the optical intensity transposition described in the previous section, Alice will first illuminate the scattering medium with a point source to establish the channels. Bob will then measure the transmitted speckle pattern on a camera. Each bright speckle spot on the camera will represent a bright channel through the scattering medium back to Alice's initial point source. In other words, if Bob places a point source at that bright speckle location, Alice will receive a bright speckle. The opposite is true for the dark speckle spots on Bob's camera. Placing a point source at one of these dark points will cause Alice to receive a dark speckle. The relationship allows Bob to send a '1' bit (or '0' bit) by injecting photons to bright channels (or dark channels) as shown in FIG. 5a2. As long as Bob only uses each channel once, the security of the communication channel would be preserved. An eavesdropper Chuck detects light elsewhere will not be able to glean useful information as he will receive a speckle pattern that is uncorrelated with Alice and Bob's (See Supplementary Note 3 for more details).

FIG. 5b shows the schematic of OCIS-based free-space secure communications between communication parties Alice and Bob. Each of them used a ground glass diffuser as the scattering medium. During the channel establishment phase, a camera on Bob's side was used to record the speckle intensity pattern as a channel map (b1). Then a DMD, which was pixel-to-pixel matched with the camera, was used to select bright or dark channels depending on the logic values of the message to be transmitted (b2). To enhance SNR, we combined multiple channels simultaneously to transmit one-bit data. At the same time, the photodetector on Alice's side will receive a binary intensity sequence that matches the original data. It should be noted that to avoid optical field interference between these channels, the light field on the DMD is spatially incoherent (see Methods and FIG. 7c for more details). The experimental results are shown in (FIG. 5c-f). The original data from Bob is a two-dimensional image (FIG. 5c), which was transmitted row by row to Alice. Each bit is either logic 1 or logic 0, which corresponds to a focus pattern or a null pattern described in Section Feedback based OCIS. The CNR is ~3.7 for the focus pattern and ~−1.5 for the null pattern. Upon reception by the photodetector on Alice's side, the data stream was reconstructed to an image (FIG. 5d), whose binarized version (FIG. 5e) matches the original data. In contrast, a photodetector that measured one speckle grain of the intercepted light, which mimics an eavesdropper Chuck, received a random sequence (FIG. 5f) that is uncorrelated with the original data.

To further enhance security, Alice can additionally shuffle the scattering medium (e.g. by rotating the diffuser) before her emitter and receiver to refresh the optical channel map intermittently. Effectively, secret and ever-changing channels are created between the sender and the targeted receiver, and information only streams within the channels. In addition, OCIS provides a physical layer of encryption that is highly compatible and complementary to the conventional digital key encryption. In the case where the digital key is hacked, OCIS serves as another line of defense, and vice versa. More details about the analysis on possible attacks and applicability of OCIS-based secure communications can be found in Supplementary Note 3.

Advantages and Improvements

The present disclosure reports on the concept of optical intensity channels and the approach for performing incoherent and linear operations with them. This concept is further generalized with an intensity transmission matrix framework based on the transmission matrix theory from wavefront shaping. We have experimentally demonstrated the ability of this method to form a focus pattern with feedback-based OCIS. We derived the relationship between the number of controllable modes and the contrast-to-noise ratio (CNR) of the focus pattern and experimentally demonstrate the operational speed. Interestingly, OCIS is also able to form an energy null spot, a function that is difficult to achieve with wavefront shaping approaches due to the presence of naturally occurring dark speckles[10,11]. We then reported on the optical intensity transpose, an OCIS-derived technique that uses optical speckle intensity information transmitted from a point source through a scattering medium to identify the optical channels of the scattering medium and to send light back to the location of the point source through these optical channels. Finally, using the linear operations provided by the intensity channels, we demonstrated an example practical application of OCIS—scattering medium mediated secure optical information transmission. OCIS can provide a means to transmit information in a secure way without requiring a prior secure channel OCIS opens up a new door to control light through scattering media. From the perspective of optical channels, wavefront shaping proactively measures and aligns the phase of light passing through each optical channel and therefore requires a significant amount of effort and time to process the phase information. In contrast, OCIS only needs to identify and modulate the intensity of light passing through the optical channels. The concept of OCIS extends our understanding of controlling light through scattering media. In addition, it comes with a number of important features.

First, the OCIS implementation is, in general, simple and fast because it requires only intensity information, which can be directly measured with typical optoelectronic devices. Its general simplicity versus the higher complexity of wavefront shaping implementations provides it with a speed advantage for a certain range of operation. A quantitative speed analysis is provided in Supplementary Note 2. We anticipate that the system speed can be significantly boosted by using much faster intensity modulation schemes such as amplitude modulation of diode lasers and using faster scanners such as swept source lasers. We further note that speed improvements are generally coupled with diminished photon budgets. An analysis of OCIS performance in the regime where shot noise becomes considerable is provided in Supplementary Note 1. One significant disadvantage of OCIS versus standard wavefront shaping is that the PBR and CNR enhancements are weaker functions of the number of controllable modes than those of wavefront shaping. OCIS's PBR is preset by choosing a threshold, and, as such, access to more control optical modes (N) only allows us to pick a higher threshold, optimizing PBR this way would yield ln(N) peak improvements. In comparison, PBR scales as N for wavefront shaping. This indicates that wavefront shaping should generally outperform OCIS in light starved scenarios (e.g. single photon regime) or when the goal is to achieve intensity enhancement. When photon budget is not a limiting factor and the goal is to recover information from random scattering, CNR which measures the peak to the noise fluctuations (rather than the background DC value) is actually a better gauge of the nominal SNR performance. By this measure, the CNR of OCIS scales as sqrt(N) while wavefront shaping scales as N.

Second, OCIS is intrinsically capable of displaying negative patterns. The generation of negative patterns through scattering media is, in principle, possible with wavefront shaping but highly impractical as the negative pattern created would be difficult to be distinguished from naturally occurring null points in the speckled background. In contrast, because OCIS directly operates on an intensity basis instead of controlling interference, the background formed by OCIS exhibits a much less pronounced spatial variation. Similar to the formation of a bright spot, the controllable dark spot here also carries information through scattering media. In the secure communication application, the use of null spots to carry information is especially useful because it improves the overall single to noise characteristics of the method.

Third, since OCIS directly operates on intensity, it is useful in some applications where phase measurement is difficult to achieve. In many practical cases such as free space optical communications through fog, cloud, turbid water, walls, or biological tissue, it is difficult to implement a reference beam. The demonstrated secure information streaming through scattering media is an application enabled by the reference-beam-free feature of OCIS.

Last but not least, OCIS can be implemented with spectral channels. In this case, different optical wavelengths provide different optical channels because the scattering properties are wavelength dependent. Instead of scanning through different spatial modes of the sample, one can also scan through the spectral modes to measure the throughput of the optical channels as a function of wavelength.

With its ability to confine optical information locally and specifically, OCIS can be used for imaging through scattering media as we demonstrated in Supplementary Experiment and FIG. 13. With the same principle, OCIS can also be used in secure information transmission where it helps prevent optical information from spreading globally in optical information transmission through scattering media. While we demonstrated a free-space communication scenario, the OCIS can potentially be used with multimode fibers to secure information during transmission. OICS provides a physical encryption that does not require the use of a digital key yet it's also compatible with the conventional digital key encryption and thus provides an additional layer of security. This flexibility enables OCIS in a wide range of optical information transmission applications.

In conclusion, embodiments illustrated herein describe intensity-only-based modulation strategies for controlling light transmission through scattering media. As wavefront shaping operates on optical fields but most of the end applications concern only intensity, wavefront shaping intrinsically has to deal with the nonlinear, field-to-intensity conversion problem. OCIS simplifies this problem to a linear operation by directly operating on intensity, and thus may offer superior solutions in some applications.

Example Methods

Example Experimental Setups

The optical setup of feedback-based OCIS is shown in FIG. 7a. A collimated CW laser beam (532 nm wavelength, CrystaLaser Inc.) was intensity-modulated by an acousto-optic modulator (AOM, 100 MHz, IntraAction Corp.) by taking the first order of the diffracted beam.

The modulated beam was then scanned by a galvo mirror (CRS 4 KHz, Cambridge Technology), which was imaged onto the surface of a ground glass diffuser (DG10-120, Thorlabs) through a 4-f relay system (L1, L2). The light intensity on the surface of the diffuser was ~20 mW. Another 4-f system (L3, L4) magnified the speckle to match the core diameter of the fiber. A photomultiplier tube (PMT, H7422, Hamamatsu) was used to measure the speckle intensity, and the output signal was sent to an analog comparator (LM361N, Texas Instruments). An FPGA board (Cyclone 2, Altera) that was synchronized with the galvo mirror received and processed the output signals from the comparator. The output signals from the FPGA controlled an electronic switch (ZASWA-2-50DR+, Mini-circuits) to modulate the amplitude of the carrier (100 MHz) to the AOM. A camera (GX1920, Allied Vision) was placed on the conjugate plane of the fiber to observe the optical patterns.

The optical setup of optical intensity transpose is shown in FIG. 7b. During the recording process (FIG. 7b), lens L3 created an optical spot behind the ground glass diffuser and the optical spot was conjugated with the camera by a 4-f system (L3 and L4). The light from the optical spot was then scattered by the diffuser and the PMT recorded the intensity on the Fourier plane of the galvo mirror which was conjugate the surface of the diffuser. During the playback process (FIG. 7b2), the collimated laser beam that was aligned to be conjugated to the fiber end was modulated by the AOM when the galvo mirror was scanning. In the same way as feedback-based OCIS, the FPGA received the binarized signals from the comparator and output the signals to control the AOM for OCIS.

The optical setup for realizing imaging through scattering media is shown in FIG. 7c. We used a ground glass diffuser, the same as the one used in feedback-based OCIS demonstration, as the backscattering surface. The camera measured a speckle pattern after light backscattered from the surface. During data streaming, we randomly selected ~300 sub-channels (corresponding to ~300 speckles) to form a channel. The light intensity modulation was realized with a DMD system (Discovery 4100, Texas Instruments). To assure linear intensity operation as described in the intensity transmission matrix theory, the DMD modulates spatially incoherent light, which was scattered by a rotating diffuser in front of the coherent laser source.

Mathematical Derivation of CNR and PBR

OCIS Optical Spot

Here we quantitatively evaluate the performance of OCIS techniques. Assuming the instantaneous speckle patterns are fully developed[12], the speckle intensity follows an exponential distribution with mean $\mu$ and standard deviation $\sigma=\mu$. The shot noise effect will be considered in the next section. The probability density function is given by $$P(I) = \frac{1}{\mu}\exp\left(-\frac{I}{\mu}\right), \tag{S1}$$

where $\mu$ is the mean intensity of the speckle pattern. Then, $\alpha$, the portion of patterns in which the intensity value of the pixel of interest is higher than a threshold $I_t$ is given by $$\alpha = \int_{I_t}^{\infty} \frac{1}{\mu}\exp\left(-\frac{I}{\mu}\right)dI = \exp\left(-\frac{I_t}{\mu}\right). \tag{S2}$$

The mean intensity of the pixel of interest among these patterns is therefore given by $$\overline{I_p} = \int_{I_t}^{\infty} I \times \frac{P(I)}{\alpha}dI. \tag{S3}$$

Substituting Equations (S1) and (S2) into Equation (S3) leads to $$\overline{I_p} = \mu + I_t. \tag{S4}$$

If our system captures N independent speckle patterns in total, the number of selected patterns is then approximately $\alpha N$. Since the OCIS sums up all the selected patterns, the peak intensity of the resultant pattern on average is given by $\overline{I_{sp}} = \alpha N \overline{I_p}$, while the mean and standard deviation of the background of the resultant pattern is given by $\overline{I_{sb}} = \alpha N \mu$ and $\sigma_{sb} = \sqrt{\alpha N}\sigma = \sqrt{\alpha N}\mu$. The contrast-to-noise ratio (CNR) is given by $$CNR_P = \frac{\overline{I_{sp}} - \overline{I_{sb}}}{\sigma_{sb}} = \sqrt{\alpha N}\frac{I_t}{\mu} = \sqrt{N}\exp\left(-\frac{I_t}{2\mu}\right)\frac{I_t}{\mu}. \tag{S5}$$

The PBR of OCIS is given by $$PBR_P = \frac{\overline{I_{sp}}}{\overline{I_{sb}}} = \frac{\alpha N \overline{I_p}}{\alpha N \mu} = \frac{\mu + I_t}{\mu} = 1 + \frac{I_t}{\mu}. \tag{S6}$$

From Equation S5 and S6, we find that both CNR and PBR are functions of intensity threshold $I_t$ that we choose. Therefore, by selecting a proper threshold, we can optimize the CNR or PBR accordingly. Here we analyze the solutions for CNR and PBR optimization, respectively. The subscripts "A" and "B" in CNRs and PBRs below correspond to "a. CNR optimization" and "b. PBR optimization", respectively.

a. CNR Optimization

Through optimization, we find that maximum CNR is achieved when the intensity threshold is set at double of the mean intensity, that is $I_t=2\mu$. In this case, the CNR given by Equation S5 becomes $$CNR_{P\_A} = \frac{2}{e}\sqrt{N}, \tag{S7}$$

and the PBR given by Equation S6 becomes $$PBR_{P\_A} = 3. \tag{S8}$$

In this case, PBR decouples from CNR and is a constant independent of the number of summed speckle patterns. In our experiment (FIG. 3b in the article, $\tau=500$ ms), we achieved a PBR of ~2.5.

b. PBR Optimization

To maximize PBR, one would set $I_t$ as high as possible as indicated by Equation S6. However, the maximum $I_t$ is bounded by the requirement that on average one speckle pattern is selected during display. This requirement can be describes as $\alpha N=1$. Substituting $\alpha$ with Equation S2, we find that the intensity threshold for PBR optimization is given by $I_t = \mu \ln N$. Substituting this equation into Equation S6, we have the maximum PBR:

$$PBR_{P\_B} = 1 + \ln N \tag{S9}$$

Using this intensity threshold to calculate CNR based on Equation S5, we have $$CNR_{P\_B} = \ln N \tag{S10}$$

Equations S9 and S10 show that the PBR and CNR are coupled in this case. This relationship, PBR=CNR+1, is the same as that in wavefront shaping because in both cases the intensity distribution of the background follows speckle intensity distribution where its mean intensity equals to its standard deviation.

FIG. 10 plots CNR and PBR as a function of number of measured optical modes. From this figure, we can find that in CNR optimization mode, CNR increases as a function of number of optical modes while the PBR remains the same. The enhancement in CNR means that the optical spot is more evident, which is the key metric to evaluate the ability of an imaging technique. In contrast, PBR fails to indicate this ability in this mode as it remains constant over the number of optical modes. In the PBR optimization mode, PBR and CNR are coupled and thus both of them can be used to evaluate the performance of an imaging technique.

Effect of Shot Noise

As the number of photons per speckle on each speckle pattern becomes lower, the photon shot noise becomes considerable. For simplicity, this section inherits the notation and other notations that are used to denote intensity in the previous section, but use them here to indicate the numbers of photons within the time window of interest per speckle grain. The combination of the speckle noise and the shot noise can be calculated based on the total variance law:

$$\sigma_t^2 = \alpha N \mu^2 + \alpha N \mu, \tag{S11}$$

where the two terms on the right side are the variance of the speckle noise and the variance of the shot noise, respectively. Using the total noise to calculate the CNR, we have $$CNR_P^T = \frac{\overline{I_{sp}} - \overline{I_{sb}}}{\sigma_t} = \frac{\alpha N I_t}{\sqrt{\alpha N \mu^2 + \alpha N \mu}} = \sqrt{N}\exp\left(-\frac{I_t}{2\mu}\right)\frac{I_t}{\sqrt{\mu^2 + \mu}}. \tag{S12}$$

Similar to the derivation for Equation S7, the maximum CNR can be achieved by setting $I_t=2\mu$, and Equation S12 becomes $$CNR_{P\_A}^T = \frac{2}{e}\sqrt{N}\frac{1}{\sqrt{1+\frac{1}{\mu}}}. \tag{S13}$$

Figure 11:
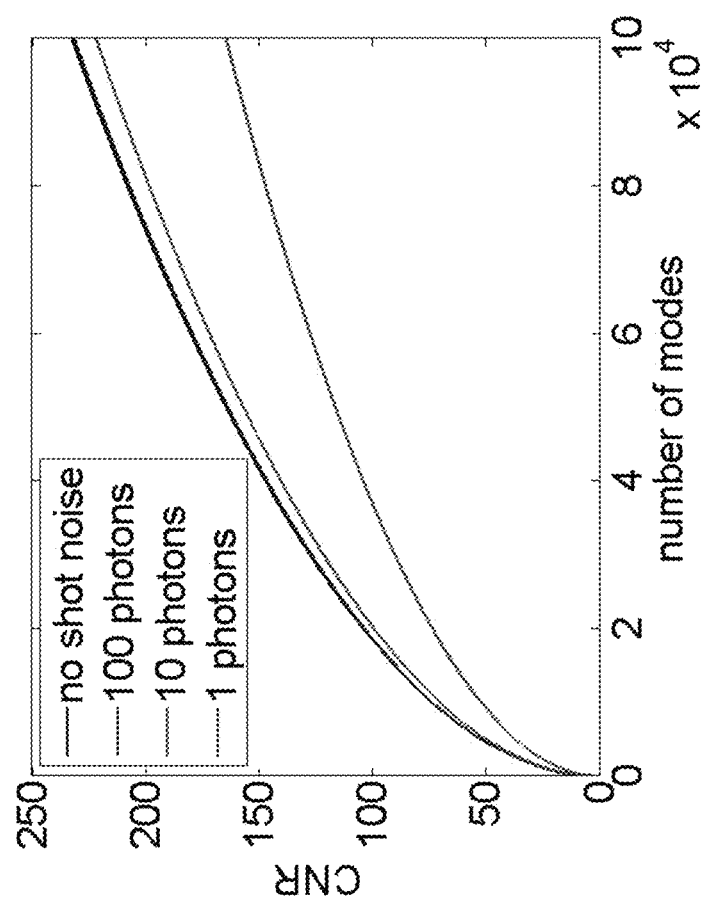
FIG. 11. CNR as a function of number of modes including shot noise. CNR enhancement plots with different number of photons per speckle at the background.

Compared to Equation S7, we find that the shot noise becomes considerable to the displayed pattern when the average number of photons per speckle within the time window of interest is on the order of one or less. FIG. 11 shows the relation between CNR and N at different levels of shot noise based on Equation S13. In our experiment (FIG. 3b in the article) the light intensity on the background is about $3.2\times10^5$ photons per ms per speckle.

From Equation S11, we notice that the variance of the background consists of speckle noise and shot noise, and the noise terms determine the signal-to-noise ratio (SNR) of the optical spot. When the photon budget is high enough that the shot noise is negligible to the speckle noise, the SNR of the optical spot is more related to the CNR; As the photon budget becomes lower that the shot noise dominates the speckle noise, the SNR of the optical spot is more related to the PBR since the shot noise directly results from the fluctuation of the background.

Null Energy Point

For an OCIS generated null energy point, the portion of speckle patterns being selected is given by $$\alpha = \int_0^{I_t} \frac{1}{\mu}\exp\left(-\frac{I}{\mu}\right)dI = 1-\exp\left(-\frac{I_t}{\mu}\right). \tag{S14}$$

In this case, the expected intensity of the point of interest among the selected patterns is given by $$\overline{I_n} = \frac{1}{\alpha}\int_0^{I_t} I\times P(I)dI. \tag{S15}$$

By substituting the probability density function P(I) with Equation S1, we have $$\overline{I_n} = I_t - \frac{I_t}{1-\exp\left(-\frac{I_t}{\mu}\right)} + \mu. \tag{S16}$$

If the system measures N speckle patterns in total, the number of selected speckle patterns is $\alpha N$, and therefore the expected intensity of the sum of these patterns at the null energy point is given by $\overline{I_{sn}}=\alpha N\overline{I_n}$. Likewise, the expected intensity of the sum of these patterns at the background is given by $\overline{I_{sb}}=\alpha N\mu$, and the standard deviation of the background is $\sigma_{sb}=\sqrt{\alpha N}\sigma=\sqrt{\alpha N}\mu$. Therefore, the CNR, which is defined as the ratio between the background-subtracted null intensity and the standard deviation of the background, is given by $$CNR_N = \frac{\overline{I_{sn}}-\overline{I_{sb}}}{\sigma_{sb}} = -\sqrt{N}\frac{I_t}{\mu}\frac{\exp\left(-\frac{I_t}{\mu}\right)}{\sqrt{1-\exp\left(-\frac{I_t}{\mu}\right)}}. \tag{S17}$$

The PBR, which is defined as the ratio between the negative peak or null point intensity and the mean of the background, is given by $$PBR_N = \frac{\overline{I_{sn}}}{\overline{I_{sb}}} = 1 - \frac{I_t/\mu}{1-\exp\left(-\frac{I_t}{\mu}\right)} + \frac{I_t}{\mu}. \tag{S18}$$

Supplementary Note 2|Comparison of CNR Between Feedback Based OCIS and Feedback Based Wavefront Shaping.

For optical spot pattern formed by OCIS, the optimal CNR is achieved when $I_t=2\mu$ based on Equation S5. In this case, $$CNR_{OSIS} = \frac{2}{e}\sqrt{C_{OSIS}t},$$

Figure 12B:
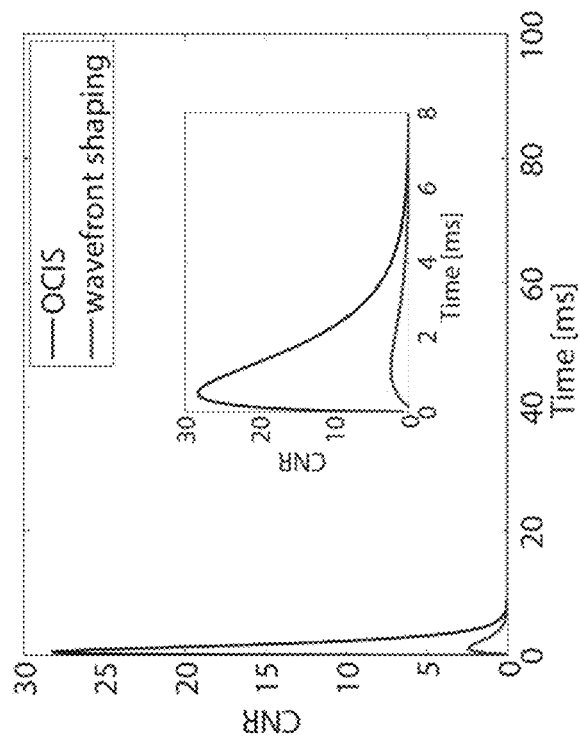
FIG. 12a-12b. Comparison of feedback based OCIS and feedback based wavefront shaping on the CNR as a function of operation time.
Figure 12A:
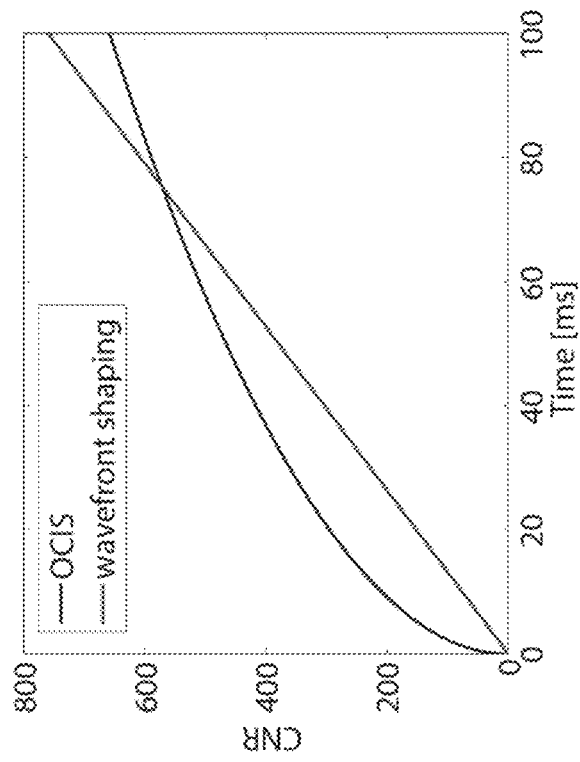

In our experiment, the maximum rotating angle ($\theta$) of the galvo mirror is 30°, and the diameter (d) of the laser beam is ~2 mm. The divergence angle ($\Delta\theta$) of the beam due to diffraction is approximately $\Delta\theta=\lambda/d=2.6\times10^{-4}$ rad=0.015°, where the optical wavelength $\lambda$ is 532 nm. Then the number of independent optical modes (N) is $N=\theta/\Delta\theta=2\times10^3$. Therefore, the number of controllable modes per unit time for intensity modulation ($C_{OSIS}$) is $C_{OSIS}=N/T=8\times10^3$ ms$^{-1}$, where T is the resonant period of the galvo mirror (250 μs). Therefore, for OCIS, the relationship between $CNR_{OSIS}$ and operation time (t) is given by $$CNR = \frac{2}{e}\sqrt{N}.$$

which is plotted in the blue curve in FIG. 12a.

For wavefront shaping, the state-of-the-art feedback-based method, which was demonstrated by Conkey, et al.[2], was able to control 256 optical modes in 33.8 ms and provided a theoretical PBR ($PBR_{WS}$) of 256 approximately. Therefore the number of controllable modes per unit time of this wavefront shaping method ($C_{WS}$) is equal to $C_{WS}=256/33.8$ ms=7.6 ms$^{-1}$. Because PBR is linear as a function of the number of controllable modes and thus the required operation time, the relationship between PBR and operation time (t) can be approximated to the equation $PBR_{WS}=C_{WS}t$, ($t|C_{WS}t>1$). The theoretical CNR of wavefront shaping ($CNR_{WS}$) is given by $CNR_{WS}=PBR_{WS}-1$, provided that the standard deviation of the fully developed speckle pattern is equal to its mean. Therefore, the relationship between CNR of wavefront shaping and operation time is $CNR_{WS}=C_{WS}t-1$, ($t|C_{WS}t>1$), which is plotted in red in FIG. 12a.

The comparison shown in FIG. 12a implies that feedback based OCIS outperforms feedback based wavefront shaping in the regime where the operation time is shorter than ~80 ms. This advantage is critical because the decorrelation time of biological tissue in vivo can be less than one millisecond[3]. For a tissue sample of decorrelation time of 1 ms, the CNR drops exponentially due to decorrelation. FIG. 12b plots the CNR as a function of time considering the effect of sample decorrelation. The advantage of high CNR enhancement in short time scale becomes prominent.

Supplementary Note 3|Discussions on the Security of OCIS-Based Communications

Figure 14B:
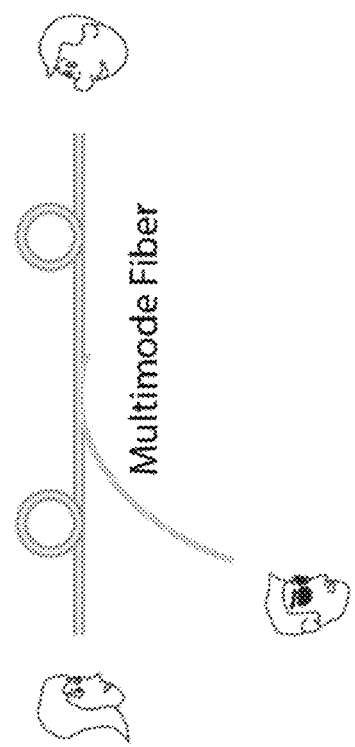
FIG. 14a-14b. Optical information coupled out of the communication chain.
Figure 14A:
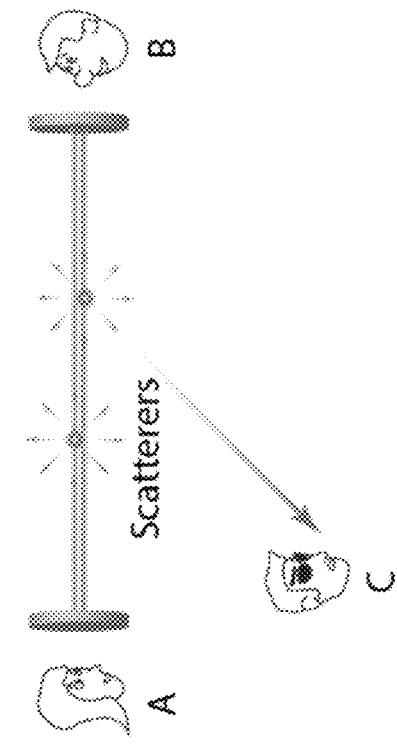

There are two typical scenarios where light can be received by a third party (FIG. 14). In free space, scatterers, such as dust, fog, turbid water, or opaque walls, scatter light outside the line-of-sight of the communication parties. In waveguide geometry, leaky modes allow the light to be coupled out of the waveguide. There is also an extreme case where an optical fiber waveguide is cut and a beam splitter is inserted in between. Although this behavior can be easily monitored, we also include it in our security analysis framework.

Without OCIS, light scattering and coupling into a third party will allow the third party to receive the same copy of the information as the primary communication parties. In this case, the security of the information only depends on the use of a digital key to encrypt the information. If the third party hacks the digital key, the information is revealed.

OCIS provides a physical layer of encryption, which can be used on top of digital encryption. Here we analyze the probability of decoding the OCIS encrypted information by coupling and detecting the light during propagation in the aforementioned scenarios. In principle, if the third party (Chuck) can measure the full optical field from the primary communication parties (Alice and Bob), he can decode the information by correlating the two optical fields based on the time-reversal symmetry of light propagation. In practice, measuring the optical field in the middle of the scattering media is extremely challenging in OCIS for several reasons. First, measuring the full field requires a full coverage in free space or cutting the optical fibers, which can be easily monitored as discussed above. Second, OCIS can use multiple spatially incoherent light sources, between which there is no static phase difference, to prevent phase measurement. Therefore, we would like to focus on a more practical case where intensity patterns are measured in the middle.

Here is the process of the intensity pattern measurement. First, Alice sends a single-mode laser pulse through the scattering media to establish a channel map with Bob. Chuck measures a speckle pattern in the middle of the scattering medium, and Bob measures a speckle pattern on the other end of the scattering medium. For simplicity, here we analyze the case where Bob only sends light through one channel for one bit of information transmission. This channel is randomly selected from the channels that meet the intensity requirement and the scattering medium is refreshed when all the channels have been used. Chuck measures the second speckle pattern in the middle when Bob sends one bit back to Alice. In this case, Chuck tries to decode the information by calculating the sign of the correlation coefficient between the speckle patterns.

Mathematically, we can explicitly calculate the correlation coefficient C of the intensity patterns measured by Chuck and analyze its expected value and the standard deviation. The correlation coefficient C has the form of $$C = \frac{\frac{1}{M_0}\sum_{r=1}^{M_0}(I_{C,A}(r) - \overline{I}_{C,A})(I_{C,B}(r) - \overline{I}_{C,B})}{\overline{I}_{C,A}\overline{I}_{C,B}}, \tag{S19}$$

where $I_{C,A}(r)$ and $I_{C,B}(r)$ are the intensity patterns measured by Chuck when Alice and Bob send the light pulses, respectively; $\overline{I}_{C,B}$, and $\overline{I}_{C,A}$ are the mean intensities of these two patterns, respectively; $M_0$ is the total number of spatial modes generated by the scattering medium and is much larger than one; r is the index of the speckle grains. After mathematical derivation based on the complex field relationship ensured by reciprocity, the expected value of correlation coefficient C has the following expression:

$$E(C) \approx \frac{I_t - \overline{I}}{M_0 \overline{I}}, \tag{S20}$$

where $I_t$ is the intensity of the speckle grain that Bob selects as the channel to send one bit back to Alice; $\overline{I}$ is the mean intensity of the speckle grains at Bob's side. For simplicity, here we assume that Alice and Bob use the same amount of power for the laser pulses they send to each other. In this case, the speckle power that Alice observes is also $I_t$, the same as that of the speckle that Bob selects based on the intensity transmission matrix theory.

While the step by step derivation of the correlation coefficient in Eq. S20 is beyond the scope of the work, this equation has an intuitive interpretation. The numerator $I_t-\overline{I}$ indicates the power deviated from the mean power at the mode of interest that Alice observes or Bob selects. If Bob randomly picks a channel to send light back to Alice, the expected value of this deviation should be zero, and the expected correlation between Chuck's patterns is also zeros. Therefore, the expected value of the correlation coefficient describes the energy ratio between the part that is deviated from mean at the mode of interest and the total energy.

For each bit during transmission, Chuck does the correlation between the two speckle patterns and obtains one correlation coefficient C. Therefore, it is also important to know the deviation of the one-time calculation from the expected value of the correlation coefficient C. The error or the standard deviation of the correlation coefficient is given by[26]

$$\text{std}(C) \approx \sqrt{\frac{1}{M}}, \tag{S21}$$

where M is the number of modes that Chuck measures out of the $M_0$ modes carried by the scattering medium. Here we assume that the measurement is well above shot noise limit. Therefore, the SNR of the information that Chuck obtained is given by $$SNR_C = \left(\frac{E(C)}{\text{std}(C)}\right)^2 = \left(\frac{I_t - \overline{I}}{\overline{I}}\right)^2 \frac{M}{M_0^2}. \tag{S22}$$

Here we provide an example calculation of the SNR that Chuck may receive. Let's assume that a scattering medium carries $10^6$ modes ($M_0$) and Chuck measures all the modes in an extreme case ($M=M_0$); the mean of the threshold that Bob chooses is $2\overline{I}$. In this case, the SNR of the correlation coefficient C is $\sim 10^{-6}$, which is very difficult for Chuck to obtain meaning information. In practice, Chuck can only measure a small portion of the modes, resulting in an even lower SNR. The leakage of information can be further mitigated by the combination of digital encryption, such as leakage-resilient cryptography[5].

By providing a physical layer of encryption, OCIS based secure communication can be potentially applied to several scenarios including free-space and fiber-based communication. Importantly, this physical encryption is complementary to and able to work with key based encryption, which includes keys that are generated with optical approaches such as quantum key distribution[28]. Compared to quantum key distribution, OCIS does not have a strict requirement on the number of photons used in communications as long as Alice and Bob can measure sufficient photons. It should be noted that OCIS requires multimode fibers to provide the physical encryption, which is likely to be a limiting factor for immediate use in some existing networks that are based on single mode fibers. In the demonstration, we only show a one-way communication where Bob sends information to Alice. Extending to a two-way communication is straightforward—Alice will need access to multiple speckles like Bob. In our experiment, the data transfer rate is limited by the refreshing rate of the DMD. The data transfer rate can possibly be improved by using an acousto-optic deflector (AOD) to select the intensity channels in the future.

Supplementary Methods

Image Transmission Through Scattering Media with OCIS

With the knowledge of intensity mapping between the input plane and target plane, OCIS is able to correct for disordered scattering and allows for direct transmission of intensity information through scattering media. Here, we demonstrate this ability by directly imaging an object through a scattering medium. From the recording process of optical intensity transpose (FIG. 4b1 or FIG. 13a1), we can obtain a map of optical channels between the input plane and target plane during a galvo mirror scan. We can then direct the light from the high-throughput channels to a point on the detector plane during the second galvo scan. In this case, we modulate and send light to the high throughput channels sequentially when the galvo mirror rotates to positions where the channels are connected to the point (FIG. 13a1). As such, we obtain a time-averaged optical spot on the detector plane as a PSF of the imaging system.

To form a wide field image through the scattering medium, here we utilize the tilt-tilt correlation or angular memory effect of a thin scattering medium[29,30]. Within an angular memory effect range, tilting of an input wavefront to a scattering medium causes tilting of the scattered output wavefront, and these two optical wavefronts remain highly correlated. For a thin scattering medium, the correlation maintains within a reasonable tilting angle for wide field imaging. Therefore, the modulation signal that generates the PSF is also a valid solution to cast a neighboring spot on the target plane to a shifted optical spot on the detector plane through the scattering medium (FIGS. 13a2 and 13b2). The method maps to the phase compensation approach that enables wide field imaging through thin scattering medium in optical wavefront shaping[8,9]. In both cases, we can interpret the system as a piece of compensation optics that corrects for the scattering of the sample and allows us to see through the scattering medium directly (FIG. 13c). Intriguingly, no phase information or manipulation is required for OCIS to compensate for the optical scattering here.

To directly correct optical scattering and form an image in free space through a thin scattering medium experimentally, we first calibrated the scattering medium by measuring the response of a point source on the target plane through the scattering medium (FIG. 13a1). See FIG. 7d for more details on the setup. This step is the same as the recording process in optical intensity transpose. We then used a target consisting of two points near the calibration point with a separation of 20 μm (FIG. 13a2). To image the object, the laser source was modulated with the signal measured from the calibration step as the galvo mirror scans. We placed a camera with an exposure time covering the galvo scan duration to directly observe the image of the two spots on the detector plane. As shown in FIG. 13d, the image information directly was transmitted through the scattering medium with OCIS.

The optical setup of realizing imaging through scattering media is shown in FIG. 7d. The initial focus for the intensity response measurement as well as the two-point object pattern for imaging was created by using an SLM. During measurement, the SLM displayed a focus on the target plane and the PMT measured the speckle intensity signal as the galvo mirror was scanning. During wide-field imaging, the SLM displayed two foci around the original focus as a target. To directly image this target, we repeated the galvo mirror scanning and modulated the intensity of the laser illumination using the AOM based on the recorded intensity response. The camera was used to directly observe the image of the two foci through the scattering medium.

Example: Selecting a Target Pattern

As coherent light transmits through or reflected from a scattering medium, an optical speckle pattern generates[12]. The intensity of each optical speckle grain is randomly distributed. By displaying different input patterns (e.g. tilting the optical beam), we can obtain a set of realized optical speckle patterns on the output plane. If we screen the set of speckle patterns and select those constructively form a target pattern, we can create a targeted pattern by displaying only the corresponding input optical patterns. FIG. 15 illustrate the principle of selecting a set of speckle patterns that form a targeted pattern.

An example embodiment of this technique is illustrated in FIG. 16. The operation process is divided into two steps, recording (FIG. 16a) and playback (FIG. 16b). During the recording process, a set of orthogonal optical fields are injected to the scattering sample, resulting in a set of optical speckle patterns on the output plane. To generate the set of orthogonal input optical fields, a continuous-wave or quasi-continuous-wave laser source is directed to the scattering sample through a scanning galvanometer. A photodetector is used to recording the light intensity at the region of interest, generating a sequence of electrical signals. Subsequently, this signal sequence is used to modulate the light source in a first-in-last-out order as the galvanometer scans in the reversed direction. The playback process generates the targeted pattern since the sequence encodes the speckle patterns that constructively contribute to the targeted pattern. Since a typical resonant galvanometer can operate at ~10 kHz, the operational speed of this method can reach ~100 μs, an order of magnitude faster than previously demonstrated methods.

To focus light inside scattering media instead of focusing through, we can introduce a guidestar mechanism[32]. Here we use ultrasound as a guidestar to modulate or tag the scattered light inside the scattering media[33,34]. In this case, we measure the intensity of ultrasound tagged light as the galvanometer scans the input beam (FIG. 17a). Since the intensity of the ultrasound modulated light correlates with the light intensity within the ultrasound focus, an optical focus can be created at the ultrasound focus by playing back the sequence of the ultrasound modulated light intensity (FIG. 17b).

The time-varying orthogonal incident optical fields can also be generated by other devices such as spatial light modulators, digital mirror devices, and rotating polygon mirrors etc. Although it is much faster to playback the sequence following the order of the recording sequence, the order of the playback patterns can be arbitrary in principle. One can also playback all the patterns simultaneously using digital mirror devices or laser arrays.

The optical memory effect[35,36] can also be utilized to scan the created pattern through the scattering sample by tilting and/or shifting the set of input patterns. By scanning a focus across a field of view, an image can be obtained through scattering media.

Reflection Geometry

In addition to the transmission configuration, the OCIS device can also be used in a reflection geometry. FIG. 18a-18c illustrate the speckle patterns produced by the modulated electromagnetic radiation reflected from the scattering medium (e.g., a reflective display).

Example Modulation Configurations

Figure 18D:
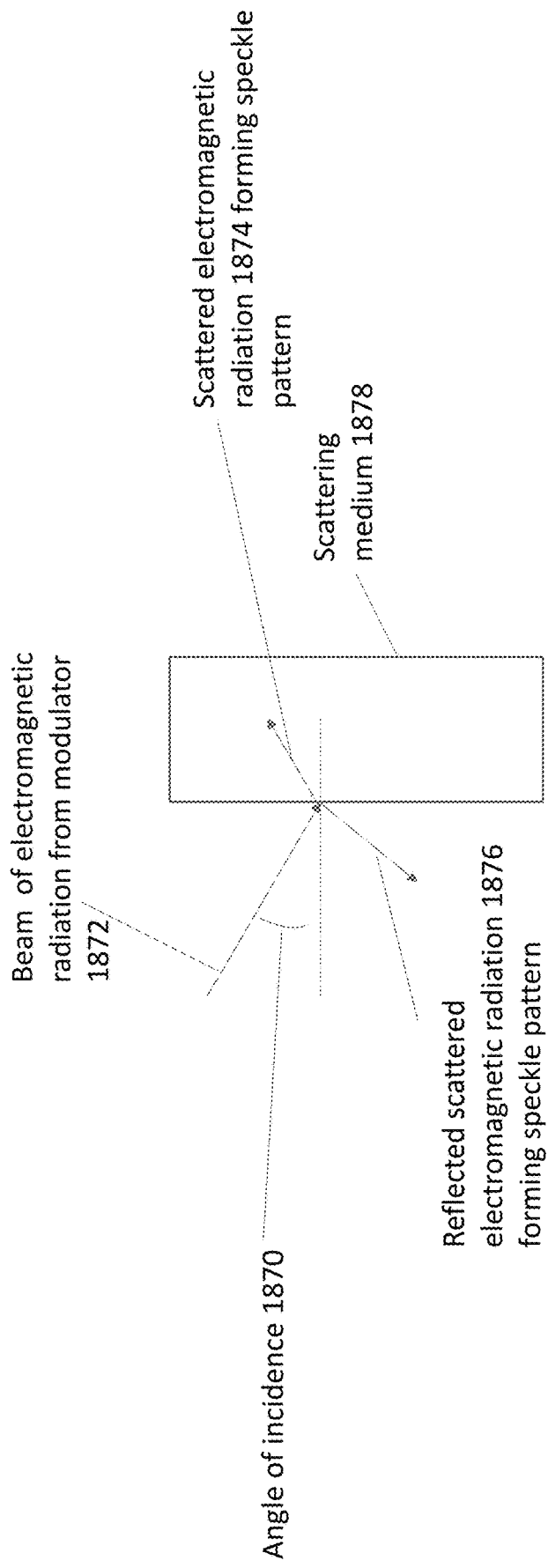
FIG. 18d illustrates the modulator outputting a beam comprising a sweep of the angle of incidence of an electromagnetic (e.g., light) beam on the input face (e.g., at a fixed location on the input face).

The modulator can modulate at least one electromagnetic property or configuration (e.g., wavelength, polarization, angle of incidence and/or location) of electromagnetic radiation 403 to output the modulated electromagnetic fields comprising a sweep over a range of different values of the at least one electromagnetic property. FIG. 18d illustrates angular sweep the incident angle 1870 of the light beam 403, 1872 to the scattering medium 1878 to generate scattered electromagnetic radiation (transmitted 1874 or reflected 1876) generating the different speckle patterns.

The electromagnetic radiation can have any wavelength including, but not limited to, visible or infrared wavelengths.

Further Device and Method Embodiments

Devices and methods according can be embodied in many ways including, but not limited to, the following.

1. FIG. 1, FIG. 2, FIG. 3, FIG. 4, FIG. 15, and FIG. 18 illustrate a device 400, 1800 comprising:

a modulator 402 transmitting a plurality (e.g., a set, or sequence) of modulated electromagnetic fields 404 to an input face 406 of a scattering medium 408, wherein each of the modulated electromagnetic fields are scattered by the scattering medium to form a different speckle pattern 1500 (e.g., a sequence of difference speckle patterns);

a detector 410 (e.g., camera, charge coupled device, photodetector) measuring an intensity 412 of each of the plurality of different speckle patterns outputted from the scattering medium;

a target 200 associated with one or more speckles P1, 1502 or one or more dark spots P2, 1504 in one or more of the different speckle patterns; and a computer 1900 connected to the modulator and the detector, the computer:

determining, from the intensity, one or more of the modulated electromagnetic fields comprising one or more target fields 414 that are scattered to form the one or more speckles or dark spots; and indicating the one or more target fields to the modulator so that the modulator transmits only the one or more target fields to the input face or and/or the modulator transmits electromagnetic radiation consisting essentially of the one or more target fields. In one or more examples, as used herein, "electromagnetic radiation consisting essentially of the one or more target fields" requires the electromagnetic radiation to include the one or more target fields but the electromagnetic radiation may also include unlisted fields that do not affect the basic and material properties of the process.

2. FIG. 4 illustrates the device of example 1, wherein the modulated electromagnetic fields are transmitted through the scattering medium to form the different speckle patterns.

3. FIG. 18a-18c illustrates an example wherein the modulated electromagnetic fields 1802 are reflected from the input face to form the different speckle patterns.

4. The device of any of the examples 1-2, wherein the plurality of modulated electromagnetic fields each comprise a different electromagnetic (e.g., optical) mode.

5. The device of any of the examples 1-3, wherein the modulator modulates at least one electromagnetic property (e.g., wavelength, polarization, and/or location) of electromagnetic radiation 403 to output the modulated electromagnetic fields comprising a sweep over a range of different values of the at least one electromagnetic property.

6. The device of any of the examples 1-4, wherein the modulator outputs at least one of:

a wavelength sweep sweeping wavelength so that each of the modulated electromagnetic fields comprise a different wavelength, a polarization sweep sweeping polarization so that each of the modulated electromagnetic fields comprise a different polarization, a location sweep (as illustrated in FIG. 4) sweeping the electromagnetic radiation 403 across the input face so that each of the modulated electromagnetic fields are transmitted to a different location on the input face, or an angular sweep so that each of the electromagnetic fields comprise are transmitted at a different angle of incidence 1870 on the input face of the scattering medium 1878 to generate the different speckle patterns (as illustrated in FIG. 18d).

7. The device of example 1, wherein:

FIG. 2 and FIG. 4 illustrate the detector detects the different speckle patterns as a temporal intensity signal 420 in response to the modulator outputting a stream or sequence of the modulated electromagnetic fields onto the input face of the scattering medium, the computer identifies one or more times T at which the temporal intensity signal has a desired intensity above or below a threshold value at the one or more speckles or one or more dark spots, and the modulator transmits the target fields comprising only of (or consisting essentially of) a portion of the stream or sequence transmitted at the one or more times.

8. FIG. 4 illustrates the device of example 6, further comprising:

a controller 430 (e.g., pulse width (PW) modulator);

a laser 432 or source of coherent electromagnetic radiation transmitting electromagnetic radiation 434 onto the modulator comprising a mirror 436, the mirror scanning the electromagnetic radiation across the input face so as to transmit each of the modulated electromagnetic fields to a different location 436 on the input face; and wherein:

the controller instructs the laser to output the electromagnetic radiation at the one or more times so that the electromagnetic radiation only irradiates the locations on the input face where the intensity at the target was measured by the detector to be above or below the threshold value.

8. FIG. 4 illustrates the device of example 1, wherein:

the detector detects the different speckle patterns as a temporal intensity signal in response to the modulator scanning a stream or sequence of the modulated electromagnetic fields onto the input face of the scattering medium, the computer:
uses the intensity to identify channels 444 of the scattering medium,
selects a set of the channels 446 forming a desired electromagnetic pattern at the target; and
the modulator streams the target fields to the set of channels.

9. FIG. 4 illustrates the device of example 1, wherein:
the detector detects the speckle pattern as a temporal intensity signal in response to the modulator scanning a stream of the electromagnetic radiation across the scattering medium to the multiple locations sequentially, and
the computer identifies one or more times at which the temporal intensity signal has the desired intensity at the one or more speckles or one or more dark spots, and
the modulator transmits the target electromagnetic radiation consisting essentially of a portion of the stream transmitted at the one or more times to the one or more locations.

9. FIG. 4 illustrates the device of example 1, wherein:
the detector detects the speckle pattern as a temporal intensity signal in response to the modulator scanning a stream of the electromagnetic radiation across the scattering medium to the multiple locations sequentially, and
the computer outputs a feedback stream to the modulator in synchronization with the modulator performing a backward scan, the feedback comprising a time-reverse of the temporal intensity signal and the backward scan comprising the scanning in time-reverse so that the target electromagnetic radiation is transmitted to the one or more locations.

10. FIG. 4 illustrates the device of example 9, wherein:
the modulator comprises a mirror 450 or scanner scanning the electromagnetic radiation across the scattering medium so that the modulated electromagnetic radiation comprises a time sequence of beam spots incident at each of the locations on the scattering medium at different times, the different times including the one or more times at which the temporal intensity signal has the desired intensity at the target; and
the computer determines the target electromagnetic radiation consisting essentially of the one or more beam spots at the one or more times for which the intensity at the target is greater than a threshold value or less than a threshold value.

11. FIG. 4 illustrates the device of example 10, further comprising:
a controller;
a laser or source of coherent electromagnetic radiation coupled to the mirror so as to transmit electromagnetic radiation 403 onto the mirror;
the mirror comprising a galvanometer mirror 452 directing the electromagnetic radiation onto the scattering medium; and wherein:
the controller instructs the laser to output the electromagnetic radiation according to a time-reversed signal comprising a time-reverse of the temporal intensity signal, as the galvanometer mirror scans backwards after scanning across the scattering medium, so that the target electromagnetic radiation comprises the electromagnetic radiation only irradiating the locations where the intensity at the target was measured by the detector to be above or below a threshold intensity. In one or more examples, the galvanometer mirror's angular position is controlled by the time-reverse of the temporal intensity signal.

12. FIG. 13 and FIG. 15 illustrates the device of any of the examples 1-11, comprising an imaging system wherein the target comprises an image 1510 being imaged by the imaging system.

13. FIG. 4 and FIG. 5 illustrates the device of any of the examples 1-12, wherein the detector 410 comprises an array of sensor pixels 504 and the target comprises one or more of the sensor pixels.

14. The device of any of the examples 1-13, wherein the computer selects the target electromagnetic radiation comprising one or more modes of the electromagnetic radiation generating or contributing to the one or more speckles or one or more dark spots at the target.

15. FIG. 17 illustrates the device of any of the examples 1-14, wherein the target comprises a guidestar 1702 within the scattering medium.

16. The device of any of the example 1-15, wherein the scattering medium comprises biological tissue, fog, cloud, turbid water, a wall, or any scattering medium for which the target is not visible through the scattering medium due to scattering of electromagnetic radiation by the scattering medium.

17. FIG. 15 illustrates the device of any of the examples 1-16, wherein the target comprises a focus 1512 of the modulated electromagnetic radiation.

18. The device of any of the examples 1-17, wherein the electromagnetic radiation comprises at least one of a spatial pattern or a temporal pattern of electromagnetic fields.

19. The device of any of the examples 1-18, wherein:
the modulator comprises a spatial light modulator and the electromagnetic radiation comprises a pattern formed by activation of one or more pixels on the spatial light modulator, and
the target electromagnetic radiation comprises a target pattern.

20. The device of example 19, wherein the spatial light modulator comprises a digital micromirror device.

21. The device of example 1, wherein the desired intensity at the target is a null energy point (zero intensity) (e.g., dark spot P2, 1504).

22. FIG. 17 illustrates the device of example 1, wherein the target comprises a focus 1702 of acoustic waves in the scattering medium and the detector measures the intensity of the one or more speckles formed by the scattered electromagnetic radiation that has been frequency shifted by acoustic waves.

23. FIG. 5 illustrates a communications network 500 comprising the device of example 1, further comprising:
a first transmitter A (e.g. Alice A) at a first location 502 and comprising the modulator;
a first receiver B (e.g., Bob, B) at a second location 504 and comprising the detector and the target comprising a first target 510 and a second target 512;
a second transmitter (Bob B) at the second location modulating second electromagnetic radiation 516 with a message 518 comprising as a series of bits 520 comprising ones and zeroes, wherein:
the computer determines:
one or more of the channels 522 comprising one or more open channels 524 through the scattering medium for which the intensity at the first target comprising the one or more speckles is greater than a threshold intensity; and
one or more of the channels comprising closed channels 526 blocking the electromagnetic radiation such that the intensity at the second target comprises the one or more dark spots having zero intensity; and
the second transmitter transmits the electromagnetic radiation modulated with "ones" through one or more of the open channels associated with the first target and transmits the electromagnetic radiation modulated with the 'zeroes' through one or more of the closed channel associated with the second target.

24. The communications network of example 23, wherein the scattering medium is moved prior to transmitting the electromagnetic radiation from the first location to the second location.

25. A computer implemented method for transmitting electromagnetic radiation, comprising:

receiving an intensity of different speckle patterns measured in a detector, the different speckle patterns outputted from a scattering medium in response to modulated electromagnetic fields transmitted to an input face of the scattering medium from a modulator, wherein the scattering medium scatters the modulated electromagnetic fields incident on the input face to form the different speckle patterns;

determining, from the intensity, one or more of the modulated electromagnetic fields comprising one or more target fields that are scattered to form one or more speckles or dark spots in one or more of the different speckle patterns, the one or more speckles or dark spots associated with a target; and indicating the one or more target fields to the modulator so that the modulator transmits only the one or more target fields to the input face.

26. A computer implemented system, comprising:

a computer comprising one or more processors; one or more memories; and one or more programs stored in the one or more memories, wherein the one or more programs executed by the one or more processors:

receive an intensity of different speckle patterns measured in a detector, the different speckle patterns outputted from a scattering medium in response to modulated electromagnetic fields transmitted to an input face of the scattering medium from a modulator, wherein the scattering medium scatters the modulated electromagnetic fields incident on the input face to form the different speckle patterns;

determine, from the intensity, one or more of the modulated electromagnetic fields comprising one or more target fields that are scattered to form one or more speckles or dark spots in one or more of the different speckle patterns, the one or more speckles or dark spots associated with a target; and indicate the one or more target fields to the modulator so that the modulator transmits only the one or more target fields to the input face.

27. The computer implemented system of example 26, wherein the computer comprises an integrated circuit comprising a field programmable gate array or an application specific integrated circuit.

28. The computer implemented system of method of any of the examples 25-28 implemented using the computer of any of the examples 1-24.

29. The device, computer, or method of any of the examples, further comprising the computer indexing or storing the positions as a function of the different times at which the desired intensity or otherwise linking or associating the positions to the different times so that the positions can be determined from the times. For example, the computer can store the data in a database comprising an array [Pi, Ti] comprising the position Pi achieved at time Ti for each of the multiple positions i.

30. The device, computer, or method of any of the examples, wherein the computer screens or filters the temporal intensity signal, or sequences the different speckle pattern to determine the one or more times 31. The device, computer, or method of any of the examples, wherein the detector measures the intensity at the target, and the computer comprises a circuit comparing the intensity to a threshold intensity and selects the target electromagnetic radiation such that the intensity is greater than the threshold intensity.

32. The device, computer, or method of any of the examples, wherein the scattered electromagnetic radiation comprises a speckle pattern and the detector measures the intensity at a speckle in a speckle pattern.

33. The device, computer, or method of any of the examples, further comprising a mount tilting, moving, or shifting the scattering medium to generate the modulated electromagnetic radiation.

34. The device, computer, or method of any of the examples, wherein a time T taken between the modulator starting the scanning of the electromagnetic radiation across the input face and the modulator transmitting the target electromagnetic radiation is less than a decorrelation time of the speckle pattern, wherein the decorrelation time is the time taken for scatterers in the scattering medium to shift position. In one or more examples, the time T taken is less than 1 millisecond, or 100 microseconds or less.

35. The device, computer, or method of any of the examples, wherein the computer includes one or more computers coupled to, or included/integrated in, at least one of the modulator or the detector. In one or more examples, the computers include a server computer or distributed/cloud computer connected to the modulator or detector using a communications network.

36. The device of any of the examples, further comprising a display, a projector screen or display, or an augmented reality glass comprising the scattering medium, wherein the different speckle patterns comprise a reflection of the modulated electromagnetic fields from the scattering medium. For example, the scattering medium can comprise a reflection display wherein the device outputs the target fields forming one or more images (e.g., video or still images).

37. The device of any of the examples, wherein the electromagnetic radiation (e.g., having any wavelength) modulated by the modulator is generated by or incident on the modulator from a source of coherent electromagnetic radiation (e.g., laser).

38. The device of any of the examples, wherein the compares the intensity of different speckle patterns in the sequence of different speckle patterns to determine/select the target fields generating the desired intensity at the one or more speckles or dark spots.

As illustrated herein, the present disclosure is not limited to generating different speckle patterns by transmitting electromagnetic radiation to multiple locations. To generate a set of different speckle patterns, we can also modulate the optical wavelength (e.g. using frequency swept laser) while the laser points the same location of the scattering medium. The modulator here has a broad meaning, which can modulate spatial, wavelength, polarization, and other properties or optical configurations of the electromagnetic radiation, e.g., by performing a sweep of optical modes.

While in some examples, the target fields are outputted by performing a backward scan of the mirror, a forward scan can be used as well. In this case the feedback is in the same order as the recorded signal instead of time-reverse. Moreover, in a more general sense, it's not necessary to be a forward or backward scan. Once we identify the channels of the scattering medium, we select a set of channels to form a desired optical pattern. We can stream the electromagnetic waves to the selected set of channels in any order.

Processing Environment

Figure 19:
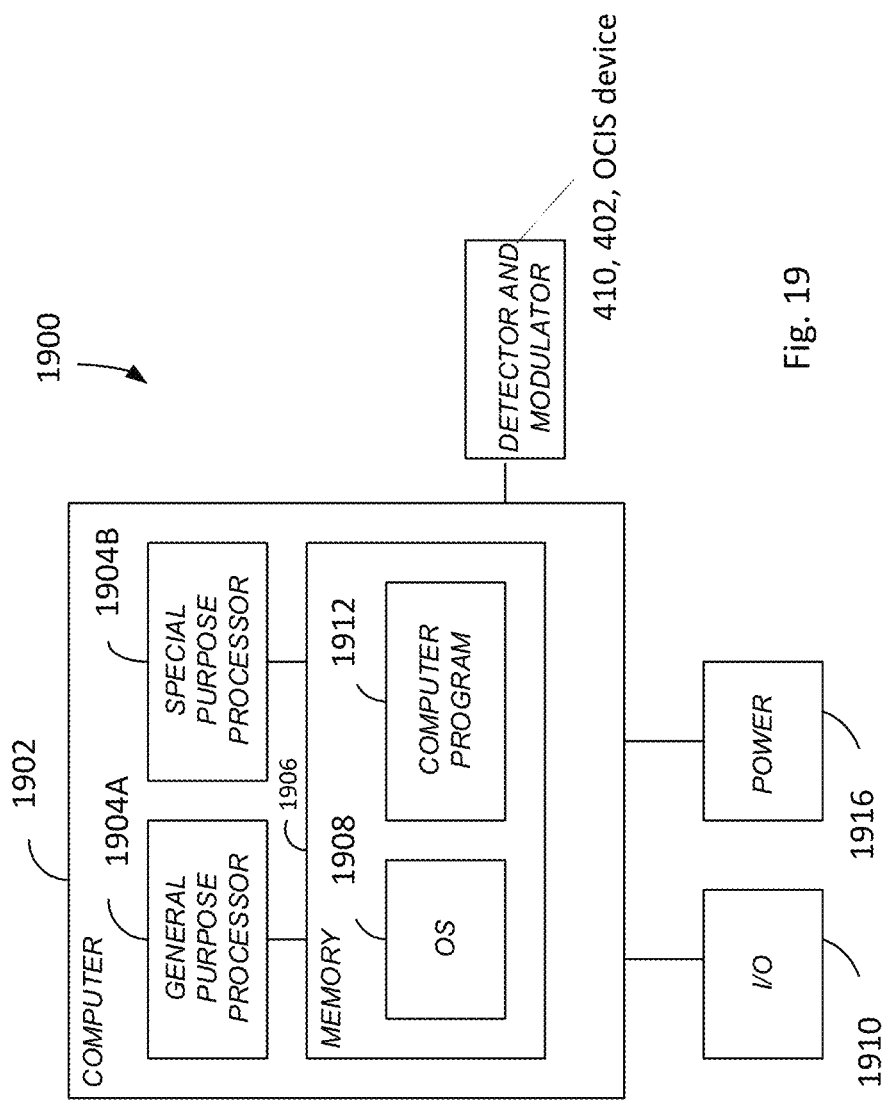
FIG. 19. Example computer system used in embodiments described herein.

FIG. 19 illustrates an exemplary system 1900 used to implement processing elements described herein including, but not limited to, processing elements needed to measure the scattered field, determine the output field, and/or control the modulator (e.g., SLM) so as to modulate the output electromagnetic radiation with the output field.

The computer 1902 comprises a processor 1904 (general purpose processor 1904A and special purpose processor 1904B) and a memory, such as random access memory (RAM) 1906. Generally, the computer 1902 operates under control of an operating system 1908 stored in the memory 1906, and interfaces with the user/other computers to accept inputs and commands) and to present results through an input/output (I/O) module 1910. The computer program application 1912 accesses and manipulates data stored in the memory 1906 of the computer 1902. The operating system 1908 and the computer program 1912 are comprised of instructions which, when read and executed by the computer 1902, cause the computer 1902 to perform the operations and/or methods herein described. In one embodiment, instructions implementing the operating system 1908 and the computer program 1912 are tangibly embodied in the memory 1906, thereby making one or more computer program products or articles of manufacture capable of performing the methods described herein (e.g., determining the locations on the input face connected to the open or closed channels). As such, the terms "article of manufacture," "program storage device" and "computer program product" as used herein are intended to encompass a computer program accessible from any computer readable device or media. In one embodiment, the special purpose processor 1904B is an application specific integrated circuit (ASIC). In one or more embodiments, computer 1902 may be coupled to, or may comprise, a personal computer (e.g., desktop computer (e.g., HP Compaq™), portable or media viewing/listening device (e.g., cellular/mobile device/phone, laptop, tablet, personal digital assistant, etc.) or integrated circuit, chip, or field programmable gate array (FPGA). In yet another embodiment, the computer 1902 may comprise a multi-touch device, gaming system, or other internet enabled device executing on various platforms and operating systems.

Those skilled in the art will recognize many modifications may be made to this configuration without departing from the scope of the present disclosure. For example, those skilled in the art will recognize that any combination of the above components, or any number of different components, peripherals, and other devices, may be used.

REFERENCES

1. Vellekoop, I. M. & Mosk, A. P. Focusing coherent light through opaque strongly scattering media. *Opt. Lett.* 32, 2309-2311 (2007).
2. Mosk, A. P., Lagendijk, A., Lerosey, G. & Fink, M. Controlling waves in space and time for imaging and focusing in complex media. *Nature Photonics* vol. 6 283-292 (2012).
3. Horstmeyer, R., Ruan, H. & Yang, C. Guidestar-assisted wavefront-shaping methods for focusing light into biological tissue. *Nat. Photonics* 9, 563-571 (2015).
4. Rotter, S. & Gigan, S. Light fields in complex media: Mesoscopic scattering meets wave control. *Rev. Mod. Phys.* 89, 015005 (2017).
5. Kim, M., Choi, W., Choi, Y., Yoon, C. & Choi, W. Transmission matrix of a scattering medium and its applications in biophotonics. *Opt. Express* 23, 12648-12668 (2015).
6. Yu, H. et al. Recent advances in wavefront shaping techniques for biomedical applications. *Curr. Appl. Phys.* 15, 632-641 (2015).
7. Popoff, S. M. et al. Measuring the Transmission Matrix in Optics: An Approach to the Study and Control of Light Propagation in Disordered Media. *Phys. Rev. Lett.* 104, 100601 (2010).
8. Yu, H. et al. Measuring Large Optical Transmission Matrices of Disordered Media. *Phys. Rev. Lett.* 111, 153902 (2013).
9. Jang, M. et al. Wavefront shaping with disorder-engineered metasurfaces. *Nat. Photonics* 12, 84-90 (2018).
10. Daniel, A., Liberman, L. & Silberberg, Y. Wavefront shaping for glare reduction. *Optica* 3, 1104 (2016).
11. Xu, J., Ruan, H., Liu, Y., Zhou, H. & Yang, C. Focusing light through scattering media by transmission matrix inversion. *Opt. Express* 25, 27234 (2017).
12. Goodman, J. *Speckle phenomena in optics: theory and applications.* (Roberts and Company Publishers, 2007).
13. Vellekoop, I. M., van Putten, E. G., Lagendijk, A. & Mosk, A. P. Demixing light paths inside disordered metamaterials. *Opt. Express* 16, 67 (2008).
14. Vellekoop, I. M. Feedback-based wavefront shaping. *Opt. Express* 23, 12189-12206 (2015).
15. Bromberg, Y., Katz, 0. & Silberberg, Y. Ghost imaging with a single detector. *Phys. Rev. A* 79, 053840 (2009).
16. Hsieh, C., Pu, Y., Grange, R. & Psaltis, D. Digital phase conjugation of second harmonic radiation emitted by nanoparticles in turbid media. *Opt. Express* 18, 533-537 (2010).
17. Cui, M. & Yang, C. Implementation of a digital optical phase conjugation system and its application to study the robustness of turbidity suppression by phase conjugation. *Opt. Express* 18, 3444-3455 (2010).
18. Wang, D. et al. Focusing through dynamic tissue with millisecond digital optical phase conjugation. *Optica* 2, 728-735 (2015).
19. Bromberg, Y. et al. Remote key establishment by random mode mixing in multimode fibers and optical reciprocity. *Opt. Eng.* 58, 1 (2019).
20. Horstmeyer, R., Judkewitz, B., Vellekoop, I. M., Assawaworrarit, S. & Yang, C. Physical key-protected one-time pad. *Sci. Rep.* 3, 1-6 (2013).
21. Clemente, P., Durán, V., Torres-Company, V., Tajahuerce, E. & Lancis, J. Optical encryption based on computational ghost imaging. *Opt. Lett.* 35, 2391 (2010).
22. Bennett, C. H., Bessette, F., Brassard, G., Salvail, L. & Smolin, J. Experimental quantum cryptography. *J. Cryptol.* 5, 3-28 (1992).
23. Popoff, S., Lerosey, G., Fink, M., Boccara, A. C. & Gigan, S. Image transmission through an opaque material. *Nat. Commun.* 1, 81 (2009).
24. Conkey, D. B., Caravaca-Aguirre, A. M. & Piestun, R. High-speed scattering medium characterization with application to focusing light through turbid media. *Opt Express* 20, 1733-1740 (2012).
25. Durduran, T., Choe, R., Baker, W. B. & Yodh, A. G. Diffuse optics for tissue monitoring and tomography. *Reports on Progress in Physics* vol. 73 076701 (2010).
26. Student. Probable error of a correlation coefficient. Biometrika 6, 302-310 (1908).
27. Kalai, Y. T. & Reyzin, L. *A Survey of Leakage-Resilient Cryptography.* https://eprint.iacr.org. (2019).

28. Bennett, C. H., Bessette, F., Brassard, G., Salvail, L. & Smolin, J. Experimental quantum cryptography. *J. Cryptol.* 5, 3-28 (1992).
29. Freund, I., Rosenbluh, M. & Feng, S. Memory Effects in Propagation of Optical Waves through Disordered Media. *Phys. Rev. Lett.* 61, 2328-2331 (1988).
30. Katz, O., Small, E. & Silberberg, Y. Looking around corners and through thin turbid layers in real time with scattered incoherent light. *Nat. Photonics* 6, 549-553 (2012).
31. Katz, O., Heidmann, P., Fink, M. & Gigan, S. Non-invasive single-shot imaging through scattering layers and around corners via speckle correlations. *Nat. Photonics* 8, 784-790 (2014).
32. Horstmeyer, R., Ruan, H. & Yang, C. Guidestar-assisted wavefront-shaping methods for focusing light into biological tissue. *Nat. Photonics* 9, 563-571 (2015).
33. Wang, Y. M., Judkewitz, B., DiMarzio, C. A. & Yang, C. Deep-tissue focal fluorescence imaging with digitally time-reversed ultrasound-encoded light. *Nat Commun* 3, 928 (2012).
34. Ruan, H., Jang, M., Judkewitz, B. & Yang, C. Iterative time-reversed ultrasonically encoded light focusing in backscattering mode. *Sci. Rep.* 4, 7156 (2014).
35. Freund, I., Rosenbluh, M. & Feng, S. Memory Effects in Propagation of Optical Waves through Disordered Media. *Phys. Rev. Lett.* 61, 2328-2331 (1988).
36. Judkewitz, B., Horstmeyer, R., Vellekoop, I. M., Papadopoulos, I. N. & Yang, C. Translation correlations in anisotropically scattering media. *Nat. Phys.* 11, 684-689 (2015).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:
a mount for mounting a scattering medium;
a modulator positioned relative to the mount, for transmitting a plurality of modulated electromagnetic fields to an input face of the scattering medium when the scattering medium is mounted on the mount, wherein each of the modulated electromagnetic fields are scattered by the scattering medium to form a different speckle pattern;
a detector positioned relative to the mount, for measuring an intensity of each of the plurality of different speckle patterns outputted from the scattering medium in response to the modulated electromagnetic fields, and
a computer connected to the modulator and the detector, the computer programmed to:
receive, from the detector, a measurement of the intensity in response to the plurality of the modulated electromagnetic fields;
determine, from the intensity and in response to an input comprising a target associated with one or more selected speckles or one or more selected dark spots in one or more of the different speckle patterns, one or more of the modulated electromagnetic fields comprising one or more target fields that are scattered to form the one or more speckles or one or more dark spots; and
output the one or more target fields to the modulator so that the modulator transmits only the one or more target fields to the input face.

2. The device of claim 1, wherein the detector is positionable relative to the mount to detect:
the modulated electromagnetic fields transmitted through the scattering medium to form the different speckle patterns, and/or
the modulated electromagnetic fields reflected from the input face to form the different speckle patterns.

3. The device of claim 1, wherein the modulator is configured to output the plurality of modulated electromagnetic fields each comprising a different electromagnetic mode.

4. The device of claim 1, wherein the modulator is activatable to modulate an electromagnetic property of electromagnetic radiation to output the modulated electromagnetic fields comprising a sweep or scan over a range of different values of the electromagnetic property.

5. The device of claim 1, wherein the modulator is activatable to output at least one of:
a wavelength sweep so that each of the modulated electromagnetic fields comprise a different wavelength,
a polarization sweep so that each of the modulated electromagnetic fields comprise a different polarization,
a location sweep so that each of the modulated electromagnetic fields are transmitted to a different location on the input face, or
an angular sweep so that each of the electromagnetic fields are transmitted at a different angle of incidence on the input face of the scattering medium to generate the different speckle patterns.

6. The device of claim 1, wherein:
the computer is programmed to:
receive from the detector the intensity comprising a temporal intensity signal in response to the modulator outputting a stream or sequence of the modulated electromagnetic fields onto the input face of the scattering medium,
identify one or more times at which the temporal intensity signal has a desired intensity above or below a threshold value at the one or more selected speckles or one or more selected dark spots, and
instruct the modulator to transmit the target fields comprising only of a portion of the stream or sequence transmitted at the one or more times.

7. The device of claim 6, further comprising:
a laser positioned to transmit electromagnetic radiation onto the modulator comprising a mirror, the mirror positioned to scan the electromagnetic radiation across the input face so as to transmit each of the modulated electromagnetic fields to a different location on the input face; and
a controller connected to the laser for instructing the laser to output the electromagnetic radiation a the one or more times so that the electromagnetic radiation only irradiates the locations on the input face where the intensity at the target was measured by the detector to be above or below the threshold value.

8. The device of claim 1, wherein the computer is programmed to:
receive the intensity comprising a temporal intensity signal in response to the modulator scanning a stream of the modulated electromagnetic fields onto the input face of the scattering medium, use the intensity to identify channels of the scattering medium, select a set of the channels forming a desired electromagnetic pattern at the target; and instruct the modulator to stream the target fields to the set of the channels.

9. The device of claim 1, further comprising a display, a projector screen or display, or an augmented reality glass comprising the scattering medium, wherein the different speckle patterns comprise a reflection of the modulated electromagnetic fields from the scattering medium.

10. The device of claim 1, comprising an imaging system wherein the target comprises at least one of an image being imaged by the imaging system, a focus of the modulated electromagnetic fields, or a guidestar within the scattering medium.

11. The device of claim 1, wherein the detector comprises an array of sensor pixels and the target comprises one or more of the sensor pixels.

12. The device of claim 1, wherein the computer comprises an integrated circuit comprising a field programmable gate array or an application specific integrated circuit.

13. The device of claim 1, wherein the scattering medium comprises biological tissue, fog, cloud, turbid water, a wall, a table, or any engineered scattering medium for which the target is not visible through the scattering medium due to scattering of electromagnetic radiation by the scattering medium.

14. The device of claim 1, wherein:

the modulator comprises a spatial light modulator and the modulated electromagnetic fields comprise a pattern formed by activation of one or more pixels on the spatial light modulator, and the target fields comprise a target pattern.

15. The device of claim 14, wherein the spatial light modulator comprises a digital micromirror device.

16. The device of claim 1, wherein the computer is programmed to determine the one or more target fields when the target is a null energy point (zero intensity).

17. The device of claim 1, wherein the target comprises a focus of acoustic waves in the scattering medium and the detector measures the intensity of the one or more selected speckles formed by scattered electromagnetic radiation that has been frequency shifted by acoustic waves.

18. A communications network comprising the device of claim 1, further comprising:

a first transmitter at a first location and comprising the modulator;

a first receiver at a second location and comprising the detector and the target comprising a first target and a second target;

a second transmitter at the second location for modulating second electromagnetic radiation with a message comprising as a series of bits comprising ones and zeroes, wherein:

the computer is programmed to determine:

one or more of channels comprising one or more open channels through the scattering medium for which the intensity at the first target comprising the one or more selected speckles is greater than a threshold intensity; and one or more of the channels comprising closed channels blocking the electromagnetic radiation such that the intensity at the second target comprises the one or more dark spots having zero intensity; and the second transmitter transmits the electromagnetic radiation modulated with "ones" through one or more of the open channels associated with the first target and transmits the electromagnetic radiation modulated with the 'zeroes' through one or more of the closed channel associated with the second target.

19. A computer implemented method for transmitting electromagnetic radiation, comprising:

receiving an intensity of different speckle patterns measured in a detector, the different speckle patterns outputted from a scattering medium in response to modulated electromagnetic fields transmitted to an input face of the scattering medium from a modulator, wherein the scattering medium scatters the modulated electromagnetic fields incident on the input face to form the different speckle patterns;

determining, from the intensity, one or more of the modulated electromagnetic fields comprising one or more target fields that are scattered to form one or more selected speckles or selected dark spots in one or more of the different speckle patterns, the one or more selected speckles or one or more selected dark spots associated with a target; and indicating the one or more target fields to the modulator so that the modulator transmits only the one or more target fields to the input face.

20. A device, comprising at least one of:

one or more circuits configured to or a computer comprising one or more processors and one or more programs comprising instructions, which when executed by the one or more processors, cause the computer to:

receive an intensity of different speckle patterns measured in a detector, the different speckle patterns outputted from a scattering medium in response to modulated electromagnetic fields transmitted to an input face of the scattering medium from a modulator, wherein the scattering medium scatters the modulated electromagnetic fields incident on the input face to form the different speckle patterns;

determine, from the intensity, one or more of the modulated electromagnetic fields comprising one or more target fields that are scattered to form one or more selected speckles or one or more selected dark spots in one or more of the different speckle patterns, the one or more selected speckles or one or more selected dark spots associated with a target; and indicate the one or more target fields to the modulator so that the modulator transmits only the one or more target fields to the input face.

* * * * *